US012634115B2

(12) United States Patent
Sun et al.

(10) Patent No.: US 12,634,115 B2
(45) Date of Patent: May 19, 2026

(54) DATA TRANSMISSION METHOD, COMMUNICATION APPARATUS, AND COMMUNICATION SYSTEM

(71) Applicant: HUAWEI TECHNOLOGIES CO., LTD., Shenzhen (CN)

(72) Inventors: Desheng Sun, Shenzhen (CN); Li Ding, Shenzhen (CN); Hongjun Bi, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 18/326,340

(22) Filed: May 31, 2023

(65) Prior Publication Data

US 2023/0327852 A1    Oct. 12, 2023

Related U.S. Application Data

(63) Continuation of application No. PCT/CN2021/124185, filed on Oct. 15, 2021.

(30) Foreign Application Priority Data

Dec. 2, 2020    (CN) .......................... 202011405827.2

(51) Int. Cl.
*H04L 9/06* (2006.01)
*H04L 9/08* (2006.01)

(52) U.S. Cl.
CPC .......... *H04L 9/0618* (2013.01); *H04L 9/0825* (2013.01)

(58) Field of Classification Search
None
See application file for complete search history.

(56) References Cited

U.S. PATENT DOCUMENTS

| | | | |
|---|---|---|---|
| 9,083,516 B2 | 7/2015 | Chiesa et al. | |
| 2006/0222178 A1* | 10/2006 | Kuwabara | ........ H04N 21/23897 |
| | | | 348/E7.056 |

(Continued)

FOREIGN PATENT DOCUMENTS

| | | |
|---|---|---|
| CN | 104426631 A | 3/2015 |
| CN | 109861974 A | 6/2019 |
| CN | 110995671 A | 4/2020 |

OTHER PUBLICATIONS

IEEE Standard for Ethernet, Amendment 10: Media Access Control Parameters, Physical Layers, and Management Parameters for 200 Gb/s and 400 Gb/s Operation, IEEE Computer Society, IEEE Std 802.3bs-2017, Dec. 12, 2017, total 372 pages.

(Continued)

*Primary Examiner* — Benjamin E Lanier
(74) *Attorney, Agent, or Firm* — Rimon PC

(57) ABSTRACT

This application is applied to the field of communication technologies, and provides a data transmission method, a communication apparatus, and a communication system, to resolve a problem in the conventional technology that user service bandwidth is used for encrypted transmission. The method includes generating N ciphertext data streams, where a first ciphertext data stream is any ciphertext data stream in the N ciphertext data streams. The first ciphertext data stream includes at least two first alignment markers AMs and at least two ciphertext data segments. One ciphertext data segment is included between every two first AMs, and one first AM is included between every two ciphertext data segments. The at least two first AMs are used for aligning data of the N ciphertext data streams.

20 Claims, 15 Drawing Sheets

(56) References Cited

U.S. PATENT DOCUMENTS

2014/0362989 A1\* 12/2014 Chiesa ...................... H04L 9/12
380/256
2017/0171163 A1 6/2017 Gareau et al.
2017/0230338 A1 8/2017 Loprieno et al.
2019/0097748 A1 3/2019 Loprieno et al.

OTHER PUBLICATIONS

Build the ultimate performance of intelligent ultra, high speed optical network Huawei's new generation of high-speed coherent transmission system, ultra-high-speed-white-paper-cn, (May 25, 2018), total 31 pages (including English translation).

\* cited by examiner

| | |
|---|---|
| An optical module receives M physical channel signals | S601 |
| The optical module converts the M physical channel signals into N plaintext data streams according to a specified ratio | S602 |
| The optical module encrypts the N plaintext data streams to generate N ciphertext data streams | S603 |

DATA TRANSMISSION METHOD, COMMUNICATION APPARATUS, AND COMMUNICATION SYSTEM

CROSS-REFERENCE TO RELATED APPLICATIONS

This application is a continuation of International Application No. PCT/CN2021/124185, filed on Oct. 15, 2021, which claims priority to Chinese Patent Application No. 202011405827.2, filed on Dec. 2, 2020. The disclosures of the aforementioned applications are hereby incorporated by reference in their entireties.

TECHNICAL FIELD

Embodiments of this application relate generally to the field of communication technologies, and in particular, to a data transmission method, a communication apparatus, and a communication system.

BACKGROUND

At present, a media access control security protocol (MACSec) encryption technology is usually used in an Ethernet network to ensure security of data transmission.

Based on an open system interconnection (OSI) reference model, the MACSec technology is used in a data link layer of the OSI reference model to encrypt or decrypt an Ethernet frame. Depending on the chip supporting a MACSec function, related encryption information needs to be added to the Ethernet frame, which occupies a large amount of user service bandwidth and leads to a high power consumption cost.

SUMMARY

Embodiments of this application provide a data transmission method, a communication apparatus, and a communication system, to encrypt data transmitted at a physical layer. This avoids user bandwidth and reduces a power consumption cost.

According to a first aspect, an embodiment of this application provides a data transmission method. The method includes: generating N ciphertext data streams, where a first ciphertext data stream is any ciphertext data stream in the N ciphertext data streams, the first ciphertext data stream includes at least two first alignment markers (AMs) and at least two ciphertext data segments, one ciphertext data segment is included between every two firstAMs, one first AM is included between every two ciphertext data segments, the at least two first AMs are used for aligning data of the N ciphertext data streams, some or all of the first AMs in the at least two first AMs indicate encryption parameters of the at least two ciphertext data segments, and N is a positive integer. The method further includes sending the N ciphertext data streams.

In embodiments of this application, a data stream (or referred to as a bit stream) at a physical layer is encrypted and transmitted. An encryption parameter is indicated based on an AM, and a transmitted data stream does not occupy user service bandwidth, so that a data transmission amount can be increased, to increase a data transmission rate. In addition, all bits (including a source MAC address and a destination MAC address) in an Ethernet frame can be encrypted, so that address information is not exposed, and security can be improved.

In an optional implementation, the first ciphertext data stream includes a first AM set, the first AM set includes L first AMs, the first AM set is used for carrying an encryption parameter of at least one specified ciphertext data segment, and L is a positive integer.

In an optional implementation, the encryption parameter carried in the first AM set includes an initialization vector (IV) and a key identification; p first AMs in the first AM set are used for carrying the initialization vector IV that is repeated m times, where p is a positive integer less than L, and m is a natural number; and q first AMs in the first AM set are used for carrying the key identification that is repeated n times, where q is a positive integer less than L, and n is a natural number.

In an optional implementation, r first AMs in the first AM set are used for carrying an identifier of the first AM set, and r is a positive integer less than L.

In an optional implementation, a value of L is 50, a value of p is 48, a value of m is 11, a value of q is 1, a value of n is 11, and a value of r is 1.

In an optional implementation, the at least one specified ciphertext data segment includes the first ciphertext data segment following each first AM in the first AM set.

In an optional implementation, the at least one specified ciphertext data segment includes at least one ciphertext data segment following a specified AM, and the specified AM is a first AM that is in the first ciphertext data stream and that follows the first AM set.

In an optional implementation, the generating of N ciphertext data streams includes: obtaining N plaintext data streams, where a first plaintext data stream is any plaintext data stream in the N plaintext data streams, the first plaintext data stream includes at least two second AMs and at least two plaintext data segments, one plaintext data segment is included between every two second AMs, one second AM is included between every two plaintext data segments, and the at least two second AMs are used for aligning data of the N plaintext data streams; and generating the first ciphertext data stream based on the first plaintext data stream and the encryption parameters of the at least two ciphertext data segments.

In an optional implementation, the generating of the first ciphertext data stream based on the first plaintext data stream and the encryption parameters of the at least two ciphertext data segments includes: encrypting the at least two plaintext data segments in the first plaintext data stream based on the encryption parameters of the at least two ciphertext data segments, to obtain the at least two ciphertext data segments in the first ciphertext data stream; and processing the at least two second AMs in the first plaintext data stream based on the encryption parameters of the at least two ciphertext data segments, to obtain the at least two first AMs in the first ciphertext data stream.

In an optional implementation, the obtaining of N plaintext data streams includes: receiving M physical lane signals, where M is a positive integer; and converting the M physical lane signals into the N plaintext data streams according to a specified ratio.

According to a second aspect, an embodiment of this application provides a data transmission method. The method includes: obtaining N ciphertext data streams, where a first ciphertext data stream is any ciphertext data stream in the N ciphertext data streams, the first ciphertext data stream includes at least two first alignment markers AMs and at least two ciphertext data segments, one ciphertext data segment is included between every two firstAMs, one first AM is included between every two ciphertext data segments, the at least two first AMs are used for aligning data of the N ciphertext data streams, some or all of the first AMs in the at least two first AMs indicate encryption parameters of the at least two ciphertext data segments, and N is a positive integer; and decrypting the first ciphertext data stream based on the encryption parameters of the at least two ciphertext data segments, to obtain a first plaintext data stream, where the first plaintext data stream is any plaintext data stream in N plaintext data streams.

In embodiments of this application, a data stream (or referred to as a bit stream) at a physical layer is encrypted and transmitted. An encryption parameter is indicated based on an AM, and a transmitted data stream does not occupy user service bandwidth, so that a data sending amount can be increased, to increase a data sending rate. In addition, all bits (including a source MAC address and a destination MAC address) in an Ethernet frame can be encrypted, so that address information is not exposed, and security can be improved.

In an optional implementation, the first plaintext data stream includes at least two second AMs and at least two plaintext data segments, one plaintext data segment is included between every two second AMs, one second AM is included between every two plaintext data segments, and the at least two second AMs are used for aligning data of the N plaintext data streams.

In an optional implementation, the decrypting of the first ciphertext data stream based on the encryption parameters of the at least two ciphertext data segments to obtain a first plaintext data stream includes: decrypting the at least two ciphertext data segments in the first ciphertext data stream based on the encryption parameters of the at least two ciphertext data segments, to obtain at least two plaintext data segments in the first plaintext data stream; and processing the at least two first AMs in the first ciphertext data stream based on the encryption parameters of the at least two ciphertext data segments, to obtain at least two second AMs in the first plaintext data stream.

In an optional implementation, the first ciphertext data stream includes a first AM set, the first AM set includes L first AMs, the first AM set is used for carrying an encryption parameter of at least one specified ciphertext data segment, and L is a positive integer.

In an optional implementation, the encryption parameter carried in the first AM set includes an initialization vector IV and a key identification; p first AMs in the first AM set are used for carrying the initialization vector IV that is repeated m times, where p is a positive integer less than L, and m is a natural number; and q first AMs in the first AM set are used for carrying the key identification that is repeated n times, where q is a positive integer less than L, and n is a natural number.

In an optional implementation, r first AMs in the first AM set are used for carrying an identifier of the first AM set, and r is a positive integer less than L.

In an optional implementation, a value of L is 50, a value of p is 48, a value of m is 11, a value of q is 1, a value of n is 11, and a value of r is 1.

In an optional implementation, the at least one specified ciphertext data segment includes the first ciphertext data segment following each first AM in the first AM set.

In an optional implementation, the at least one specified ciphertext data segment includes at least one ciphertext data segment following a specified AM, and the specified AM is a first AM that is in the first ciphertext data stream and that follows the first AM set.

In an optional implementation, the decrypting of the first ciphertext data stream based on the encryption parameters of the at least two ciphertext data segments includes: decrypting the at least one specified ciphertext data segment based on the encryption parameter carried in the first AM set, to obtain a plaintext data segment corresponding to the at least one specified ciphertext data segment.

According to a third aspect, an embodiment of this application provides a communication apparatus, including a processor and a memory. The memory is configured to store computer-executable instructions. When the apparatus runs, the processor executes the computer-executable instructions stored in the memory, to enable the apparatus to perform the method in each implementation of the first aspect or the second aspect.

According to a fourth aspect, an embodiment of this application provides a communication apparatus, including units or means configured to perform the steps in the method in each implementation of the first aspect or the second aspect.

According to a fifth aspect, an embodiment of this application provides a communication apparatus, including a processor and an interface circuit. The processor is configured to: communicate with another apparatus through the interface circuit, and perform the method in each implementation of the first aspect or the second aspect. The communication apparatus may include one or more processors.

According to a sixth aspect, an embodiment of this application provides a communication apparatus, including a processor, configured to: connect to a memory, and invoke a program stored in the memory, to perform the method in each implementation of the first aspect or the second aspect. The memory may be located inside or outside the apparatus. The communication apparatus may include one or more processors.

According to a seventh aspect, an embodiment of this application further provides a computer-readable storage medium. The computer-readable storage medium stores instructions, and when the instructions are run on a computer, the method in each implementation of the first aspect or the second aspect is performed.

According to an eighth aspect, an embodiment of this application further provides a computer program product, where the computer program product includes a computer program, and when the computer program runs, the method in each implementation of the first aspect or the second aspect is performed.

According to a ninth aspect, an embodiment of this application further provides a chip system, including a processor, configured to perform the method in each implementation of the first aspect or the second aspect.

According to a tenth aspect, an embodiment of this application further provides a communication system, including the communication apparatus configured to perform the method in each implementation of the first aspect, and the communication apparatus configured to perform the method in each implementation of the second aspect.

DESCRIPTION OF EMBODIMENTS

Figure 1:
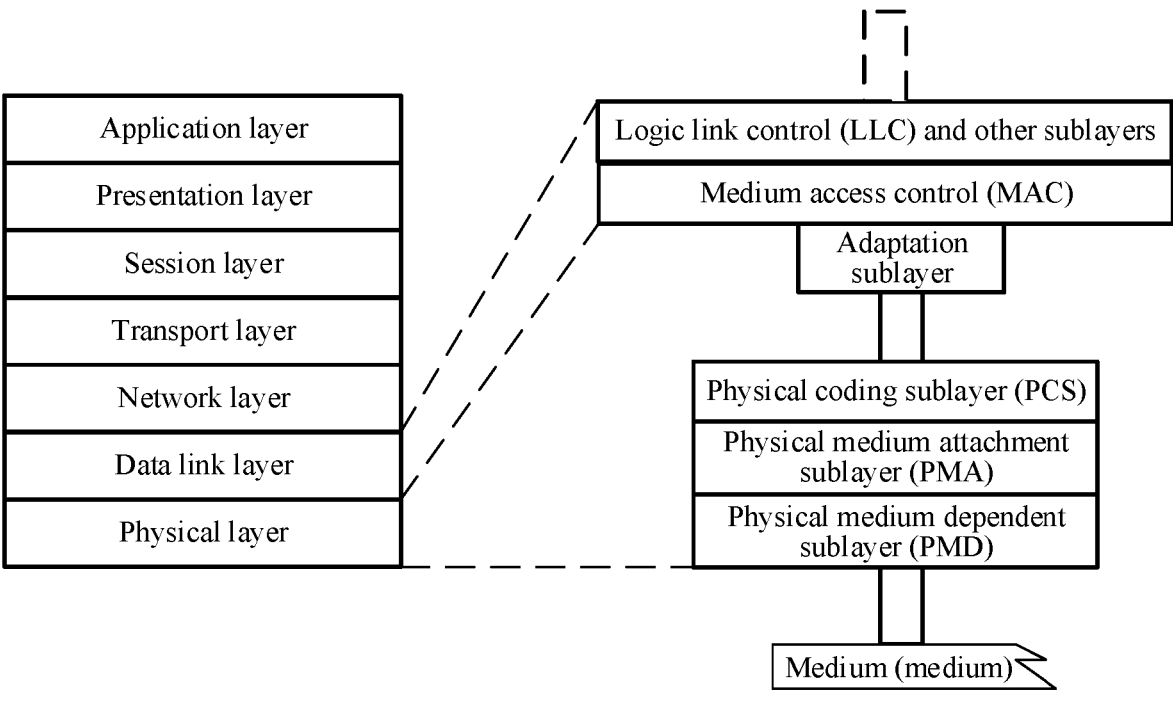
FIG. 1 is a schematic diagram of an architecture of an OSI reference model.

Embodiments of this application may be applied to data networks such as an Ethernet network or other types of network.

In the following, some terms provided in this application are described, to help a person skilled in the art have a better understanding.

(1) Ciphertext Data Stream

A ciphertext data stream indicates an encrypted signal carried by a logic lane at a physical layer. In embodiments of this application, N ciphertext data streams are encrypted data streams transmitted through N logic lanes. A ciphertext data stream in the N ciphertext data streams is referred to as a first ciphertext data stream, and the first ciphertext data stream includes at least two first alignment markers (referred to as first AMs for short below) and at least two ciphertext data segments. The at least two first AMs are used for aligning data of the N ciphertext data streams, and some or all of the first AMs in the at least two first AMs indicate encryption parameters of the at least two ciphertext data segments.

In an implementation, the first AMs and the ciphertext data segments in the first ciphertext data stream periodically appear. For example, one ciphertext data segment is included between every two first AMs in the first ciphertext data stream, and one first AM is included between every two ciphertext data segments. At least two first AMs in a same ciphertext data stream are not identical, that is, some of the at least two first AMs may be the same or some of the at least two first AMs may be different.

(2) Ciphertext Data Segment

A ciphertext data segment is encrypted bit data, and the ciphertext data segment has a total of one or more bits.

(3) Encryption Parameter

Encryption parameters include a key identification, an initialization vector (IV), and the like, and may be used to implement conversion between a plaintext and a ciphertext. In embodiments of this application, in the first ciphertext data stream, some or all of the at least two first AMs are used to indicate the encryption parameters of the at least two ciphertext data segments.

(4) Plaintext Data Stream

A plaintext data stream indicates a signal carried by a logic lane at the physical layer. In embodiments of this application, N plaintext data streams are unencrypted data streams transmitted through the N logic lanes. A plaintext data stream in the N plaintext data streams is referred to as a first plaintext data stream. The first plaintext data stream includes at least two second alignment markers (referred to as second AMs for short below) and at least two plaintext data segments. The at least two second AMs are used for aligning data of the N plaintext data streams.

In an implementation, the second AMs in the first plaintext data stream are periodically inserted, second AMs in a same plaintext data stream are the same, and second AMs in different plaintext data streams are different. The second AMs and the plaintext data segments in the first plaintext data stream periodically appear. For example, in the first plaintext data stream, one plaintext data segment is included between every two second AMs, and one second AM is included between every two plaintext data segments.

In an implementation, in embodiments of this application, the N plaintext data streams are encrypted to obtain N ciphertext data streams.

(5) Plaintext Data Segment

A plaintext data segment is unencrypted bit data, and the plaintext data segment has a total of one or more bits. In an implementation method, in embodiments of this application, the plaintext data segment is encrypted based on encryption parameters, and a corresponding ciphertext data segment may be obtained.

(6) "A plurality of" mentioned in embodiments of this application means two or more. A term "and/or" describes an association relationship between associated objects and represents that three relationships may exist. For example, A and/or B may represent the following three cases: Only A exists, both A and B exist, and only B exists. A character "/" generally indicates an "or" relationship between the associated objects. In addition, it should be understood that although terms such as "first" and "second" may be used in embodiments of the present disclosure to describe data, the data is not limited to these terms. These terms are merely used to distinguish the data from each other.

The following further describes this application in detail with reference to accompanying drawings.

Refer to an architecture of an OSI reference model shown in FIG. 1. The architecture of the OSI reference model is a network interconnection model, and defines a seven-layer framework of network interconnection, which is sequentially a physical layer, a data link layer, a network layer, a transport layer, a session layer, a presentation layer, and an application layer from bottom to top. An Ethernet network is located at the physical layer and the data link layer in the OSI reference model. As shown in FIG. 1, the data link layer includes a logic link control (LLC) sublayer and a medium access control (MAC) sublayer responsible for parsing and $CM_5$}occupies 24 bits: 32 to 55; {$UP_1$}occupies eight bits: 56 to 63; {$UM_0$, $UM_1$, $UM_2$}occupies 24 bits: 64 to 87; {$UP_2$}occupies eight bits: 88 to 95; and {$UM_3$, $UM_4$, $UM_5$}occupies 24 bits: 96 to 119.

TABLE 1

| {$CM_0$, $CM_1$, $CM_2$} {$UP_0$} {$CM_3$, $CM_4$, $CM_5$} {$UP_1$}  {$UM_0$, $UM_1$, $UM_2$}  {$UP_2$}  {$UM_3$, $UM_4$, $UM_5$} |
| --- |
| 10 | assembling Ethernet frames. The physical layer includes a physical medium dependent (PMD) sublayer, a physical medium attachment (PMA) sublayer, and a physical coding (PCS) sublayer. FIG. 1 further shows a medium connected to the PMD. The medium may be a cable, a pluggable optical module, an optical fiber, or the like.

Figure 2:
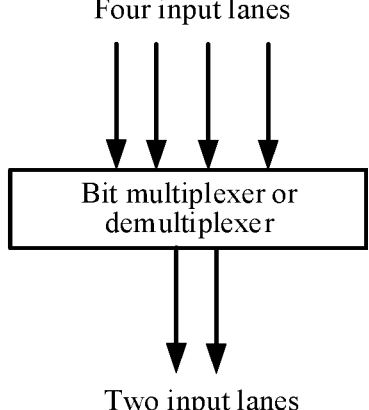
FIG. 2 is a schematic diagram of a working principle of a BitMux.

For a transmitting end, the data link layer receives packets from a user side, and then transmits the packets to the physical layer through framing at the MAC sublayer. Code blocks are encoded in the PCS at the physical layer to form a serial stream, and then the serial stream is distributed to a plurality of parallel logic lanes. Data streams of the plurality of logic lanes are converted into data streams of a plurality of physical lanes through conversion by a bit multiplexer or demultiplexer (BitMux) in the PMA sublayer. The data streams of the plurality of physical lanes are transmitted in a form of an electrical signal or an optical signal through a network medium. FIG. 2 is a schematic diagram of a working principle of a BitMux. The BitMux mainly completes conversion of a data stream of an input lane to an output lane in a bit interleaving manner. For example, there are four input lanes and two output lanes, and data streams of the two input lanes are bit interleaved into data streams of one output lane. The BitMux is deployed in PHY such as the PMA sublayer, and may be used for conversion between a logic lane and a physical lane. Alternatively, the BitMux is deployed in an optical module, and may be used for conversion between a logic lane and a physical lane.

A logic lane (logic lane) in embodiments of this application is also referred to as a virtual lane (VL), and is a PCS lane or an FEC lane (an FEC lane in a 100G standard, and a PCS lane in a 200G/400G standard). For example, in the Ethernet specification, a quantity of PCS lanes corresponding to 200G is 8, a quantity of PCS lanes corresponding to 400G is 16, a quantity of FEC lanes corresponding to 100G is 4, and logic lanes may be distributed in the PCS. A physical lane may also be referred to as a PMA lane (PL). One physical lane corresponds to one or more logic lanes, and one physical lane includes a data stream in one logic lane or data streams in a plurality of logic lanes.

When a data stream is transmitted on different logic lanes and physical lanes, to ensure that a receiving end can align a plurality of logic lanes, an alignment marker (AM) is designed in the IEEE 802.3 specification. The alignment marker may also be referred to as an alignment code block or an alignment unit. Formats of AMs of 200G and 400G are shown in Table 1. $CM_0$, $CM_1$, $CM_2$, $CM_3$, $CM_4$, and $CM_5$ are common identifiers of logic lanes, while $UM_0$, $UM_1$, $UM_2$, $UM_3$, $UM_4$, and $UM_5$ each uniquely identify one logic lane. Different logic lanes have different "$UM_0$, $UM_1$, $UM_2$, $UM_3$, $UM_4$, and $UM_5$". $UP_0$, $UP_1$, and $UP_2$ are editable fields by a user, and are usually have values specified in the IEEE 802.3 specification. A length of an AM is generally 120 bits (bits), and is positioned (position) by 0 to 119. In Table 1, {$CM_0$, $CM_1$, $CM_2$}occupies 24 bits: 0 to 23; {$UP_0$}occupies eight bits: 24 to 31; {$CM_3$, $CM_4$, 400G is used as an example. Table 2 shows 16 logic lanes that exist in 400G and a mode specified by each logic lane. The receiving end can lock a logic lane only when receiving an AM whose fields other than UP0 to UP2 match fields in the following Table 2, and correctly identify a number of the logic lane.

TABLE 2

| Number of a logic lane | Encoding (encoding) {$CM_0$, $CM_1$, $CM_2$, $UP_0$, $CM_3$, $CM_4$, $CM_5$, $UP_1$, $UM_0$, $UM_1$, $UM_2$, $UP_2$, $UM_3$, $UM_4$, $UM_5$} |
| --- | --- |
| 0 | 0x9A, 0x4A, 0x26, 0xB6, 0x65, 0xB5, 0xD9, 0xD9, 0x01, 0x71, 0xF3, 0x26, 0xFE, 0x8E, 0x0C |
| 1 | 0x9A, 0x4A, 0x26, 0x04, 0x65, 0xB5, 0xD9, 0x67, 0x5A, 0xDE, 0x7E, 0x98, 0xA5, 0x21, 0x81 |
| 2 | 0x9A, 0x4A, 0x26, 0x46, 0x65, 0xB5, 0xD9, 0xFE, 0x3E, 0xF3, 0x56, 0x01, 0xC1, 0x0C, 0xA9 |
| 3 | 0x9A, 0x4A, 0x26, 0x5A, 0x65, 0xB5, 0xD9, 0x84, 0x86, 0x80, 0xD0, 0x7B, 0x79, 0x7F, 0x2F |
| 4 | 0x9A, 0x4A, 0x26, 0x3D, 0x65, 0xB5, 0xD9, 0x19, 0x2A, 0x51, 0xF2, 0xE6, 0xD5, 0xAE, 0x0D |
| 5 | 0x9A, 0x4A, 0x26, 0xE1, 0x65, 0xB5, 0xD9, 0x4E, 0x12, 0x4F, 0xD1, 0xB1, 0xED, 0xB0, 0x2E |
| 6 | 0x9A, 0x4A, 0x26, 0x3D, 0x65, 0xB5, 0xD9, 0xEE, 0x42, 0x9C, 0xA1, 0x11, 0xBD, 0x63, 0x5E |
| 7 | 0x9A, 0x4A, 0x26, 0x22, 0x65, 0xB5, 0xD9, 0x32, 0xD6, 0x76, 0x5B, 0xCD, 0x29, 0x89, 0xA4 |
| 8 | 0x9A, 0x4A, 0x26, 0x60, 0x65, 0xB5, 0xD9, 0x9F, 0xE1, 0x73, 0x75, 0x60, 0x1E, 0x8C, 0x8A |
| 9 | 0x9A, 0x4A, 0x26, 0x6B, 0x65, 0xB5, 0xD9, 0xA2, 0x71, 0xC4, 0x3C, 0x5D, 0x8E, 0x3B, 0xC3 |
| 10 | 0x9A, 0x4A, 0x26, 0xFA, 0x65, 0xB5, 0xD9, 0x04, 0x95, 0xEB, 0xD8, 0xEB, 0x6A, 0x14, 0x27 |
| 11 | 0x9A, 0x4A, 0x26, 0x6C, 0x65, 0xB5, 0xD9, 0x71, 0x22, 0x66, 0x38, 0x8E, 0xDD, 0x99, 0xC7 |
| 12 | 0x9A, 0x4A, 0x26, 0x18, 0x65, 0xB5, 0xD9, 0x5B, 0xA2, 0xF6, 0x95, 0xA4, 0x5D, 0x09, 0x6A |
| 13 | 0x9A, 0x4A, 0x26, 0x14, 0x65, 0xB5, 0xD9, 0xCC, 0x31, 0x97, 0xC3, 0x33, 0xCE, 0x86, 0x3C |
| 14 | 0x9A, 0x4A, 0x26, 0xD0, 0x65, 0xB5, 0xD9, 0xB1, 0xCA, 0xFB, 0xA6, 0x4E, 0x35, 0x04, 0x59 |
| 15 | 0x9A, 0x4A, 0x26, 0xB4, 0x65, 0xB5, 0xD9, 0x56, 0xA6, 0xBA, 0x79, 0xA9, 0x59, 0x45, 0x86 |

Figure 3:
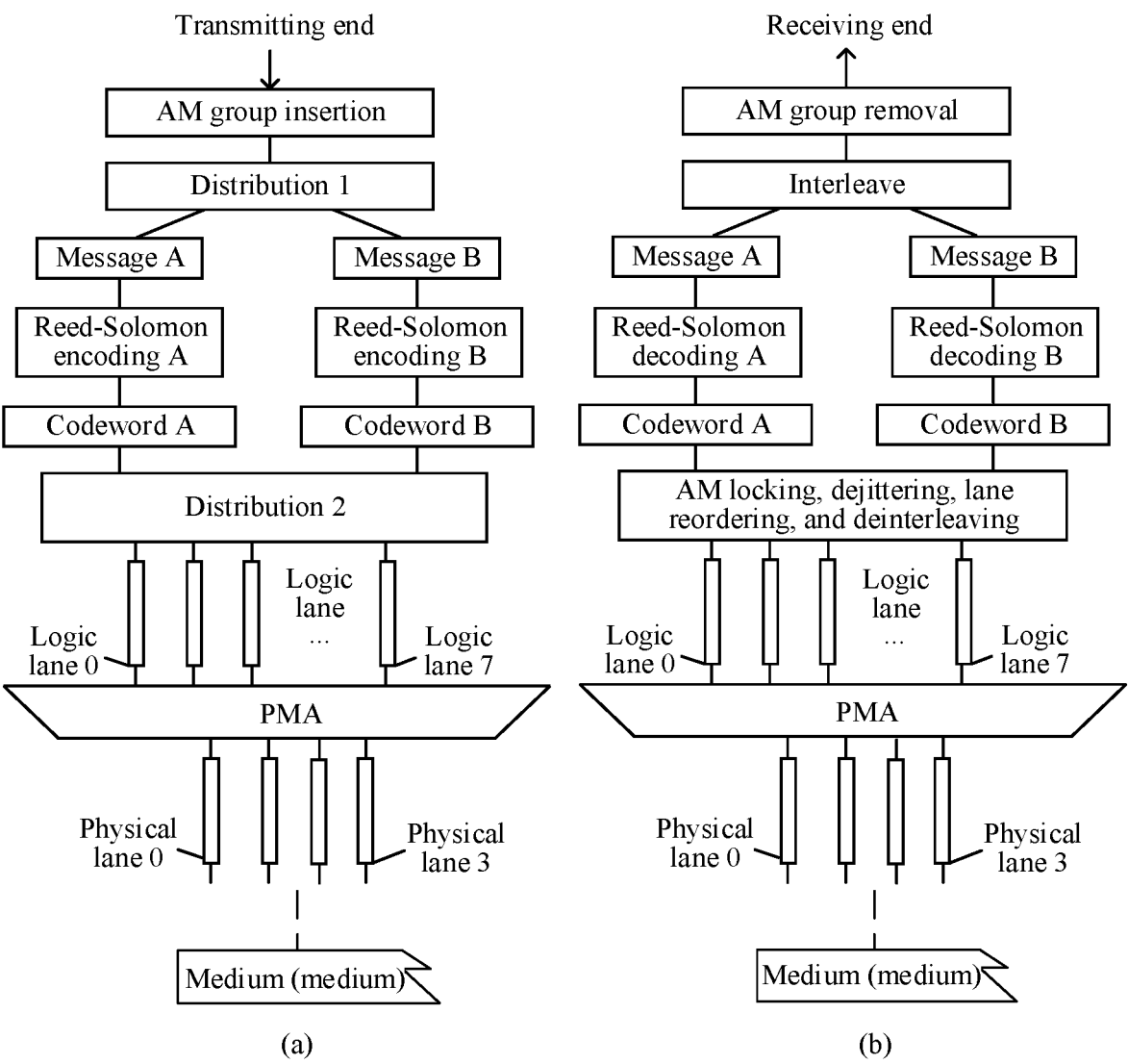
FIG. 3 is a schematic diagram of serial stream distribution interleaving.

When sending a serial stream to a plurality of logic lanes, a transmitting end periodically inserts an alignment marker (AM) into each logic lane. The receiving end obtains data streams on the plurality of logic lanes, and may lock the data streams based on the AMs of the logic lanes, to combine the data streams in the plurality of logic lanes to restore the foregoing serial stream. FIG. 3 is a schematic diagram of stream distribution interleaving, showing a distribution relationship among a logic lane, a physical lane, an AM, and a BitMux (built in PMA). As shown in (a) of FIG. 3, the transmitting end may periodically insert AMs of eight logic lanes into a serial stream, and distribute the serial stream to each logic lane after encoding by using a Reed-Solomon encoding algorithm, that is, distribute the serial stream to the eight logic lanes. It is assumed that according to a ratio of 8:4, the eight logic lanes are converted into four physical lanes by using the BitMux built in PMA. Next, the data streams of the four physical lanes are transmitted in a form of an electrical signal or an optical signal through a medium. As shown in (b) of FIG. 3, a receiving end obtains the data streams of the four physical lanes through the medium, and according to the ratio of 4:8, the four physical lanes are converted into eight logic lanes by using the BitMux built in PMA; and then operations such as AM locking, dejittering, logic lane reordering, and deinterleaving are performed. After decoding by using a Reed-Solomon encoding algorithm, the serial stream including the AM is obtained; and the serial stream is obtained by removing the AM. Optionally, an encoding and decoding error correction process may be ignored, and neither of the transmitting end and the receiving end performs an error correction process by using the Reed-Solomon encoding and decoding algorithm. This is not limited in embodiments of this application.

Figure 4A:
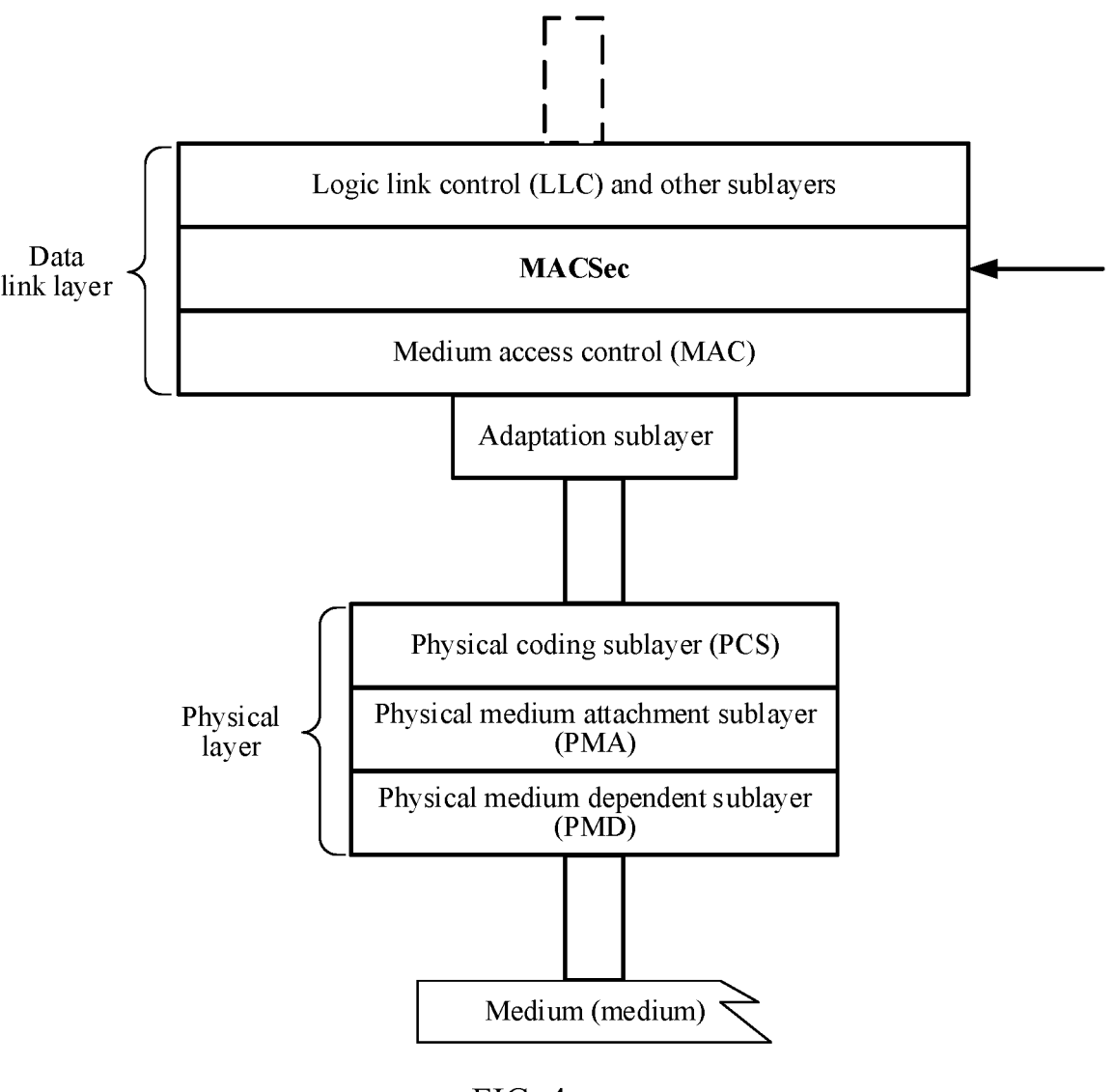
FIG. 4*a* is a schematic diagram of MACSec encryption.
Figure 4B:
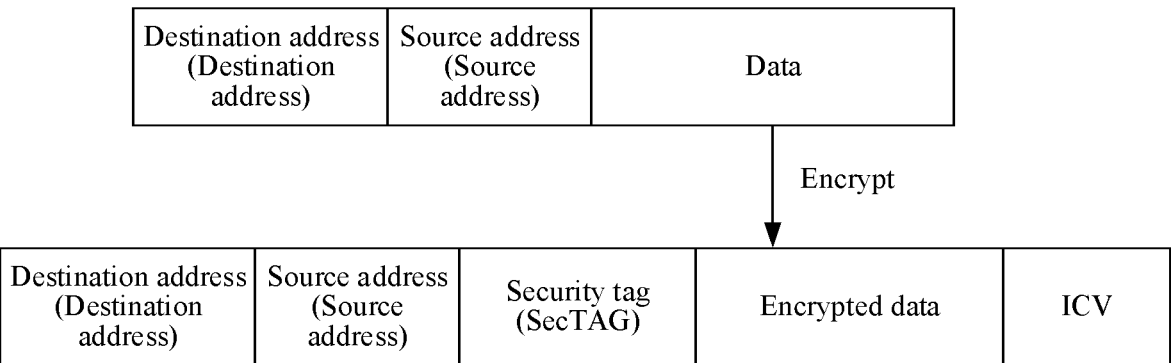
FIG. 4b is a schematic diagram of a structure of an Ethernet frame.
Figure 4C:
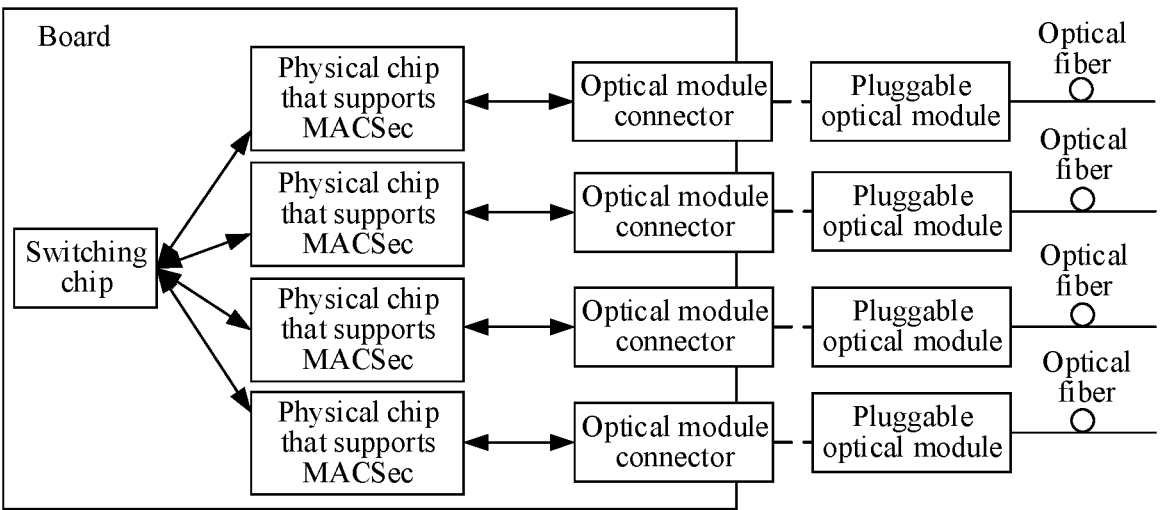
FIG. 4c is a schematic diagram of MACSec chip deployment.

FIG. 4$a$ is a schematic diagram of MACSec encryption. The currently used MACSec technology is deployed on a MAC sublayer at a data link layer. An encryption object and a decryption object are an Ethernet frame (or referred to as a user frame). FIG. 4$b$ is a schematic diagram of a structure of an Ethernet frame, including a destination address, a source address, and data. After MACSec encryption is used, the structure of the Ethernet frame is changed to: a destination address, a source address, a security tag (SecTag), encrypted data, and an integrity check vector (ICV). The SecTag includes key parameters such as a key identification and an initialization vector (IV). MACSec encrypts each frame or packet and requires that each frame carries 32 bytes. When an average frame length is 64 bytes, 32/64=50% of user bandwidth is occupied by the encryption information, resulting in a high overhead. Second, FIG. 4$c$ is a schematic diagram of MACSec chip deployment. In terms of a MACSec implementation, currently, a physical chip that supports a MACSec encryption function is usually deployed on a board, or a MACSec encryption function is integrated on a switching chip, and both are characterized by high power consumption. However, the implementation is closely related to board hardware regardless of whether the implementation is based on an independent physical chip or an integrated switching chip. The MACSec encryption function cannot be implemented based on only a conventional board. During an actual application, the requirements for port encryption usually change dynamically and are difficult to predict. For example, when a network device is first installed, only eight fixed ports support a MACSec encryption function, and requirements can be basically satisfied. As time goes on, if more MACSec ports are required during subsequent application, the only feasible solution is to update a hardware solution, requiring more investment. If a quantity of MACSec ports of a newly purchased network device is far greater than the required quantity, the investment on the extra MACSec ports tends to be wasted. Therefore, the solution cannot satisfy the requirements of an existing conventional hardware system of a client or dynamic onsite changes.

Therefore, an embodiment of this application provides a technical solution of physical layer encryption/decryption. A data stream (or referred to as a bit stream) at a physical layer is encrypted and transmitted, and a transmitted data stream does not occupy user service bandwidth, so that a data transmission amount is not affected by encryption/decryption, to increase a data transmission rate. In addition, all bits (including a source MAC address and a destination MAC address) in an Ethernet frame can be encrypted, so that address information is not exposed, and security can be improved. This solution may be applied to an optical module or a physical layer chip of a network device, and no new hardware structure needs to be added. When the network device is used at a transmitting end, an optical module or a physical layer chip used in the network device is responsible for encrypting and sending a data stream. When the network device is used at a receiving end, an optical module or a physical layer chip used in the network device is responsible for decrypting a received data stream.

Specifically, as shown in (a) of FIG. 3, for the transmitting end, an encryption solution may be implemented in a process in which the physical layer chip distributes the serial stream into data streams of a plurality of logic lanes, or implemented by an optical module (a medium) in a process of processing a data stream. As shown in (b) of FIG. 3, for the receiving end, a decryption solution may be implemented by the physical layer chip in a process after the physical layer chip obtains the data streams of the plurality of logic lanes by using PMA and before the serial stream is restored, or implemented by the optical module (medium) when processing the received data stream.

An encryption solution and a decryption solution that are applied to an optical module and that are provided in embodiments of this application are described below in detail.

Figure 5:
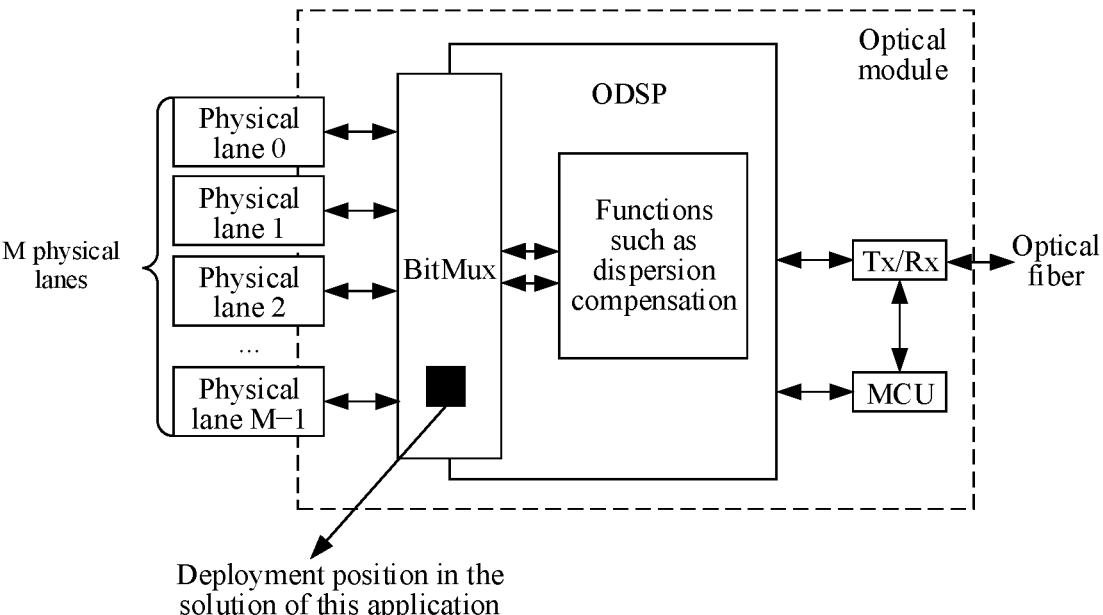
FIG. 5 is a schematic diagram of a structure of an optical module.

First, FIG. 5 is a schematic diagram of a structure of an optical module. The optical module includes a bit multiplexer or demultiplexer (BitMux), an optical digital signal processing chip (ODSP), a microcontroller unit (MCU), and an optical/electrical transceiver (TX/RX for short). When the optical module is applied to a transmitting end, the optical module receives a plurality of physical lane signals transmitted by an electrical chip at a physical layer. The BitMux is configured to convert the plurality of physical lane signals inputted into the optical module into a plurality of logic lane signals, and then convert the plurality of logic lane signals into digital signals inputted into the ODSP. The ODSP is responsible for performing algorithm processing (for example, dispersion compensation preprocessing) on the inputted digital signals, and sending the processed digital signals to another optical module through an optical fiber. When the optical module is applied to a receiving end, the optical module receives an optical signal from another optical module through an optical fiber. The optical signal is processed by using RX optical-to-electrical conversion and an ODSP algorithm (for example, dispersion compensation), and then a digital signal is outputted to the BitMux. The BitMux converts the digital signal outputted by the ODSP into a plurality of logic lane signals, converts the plurality of logic lane signals into a plurality of physical lane signals, and transmits the plurality of physical lane signals to an electrical chip at the physical layer. It should be noted that the physical lane signals and the logic lane signals are digital signals.

Figure 6A:
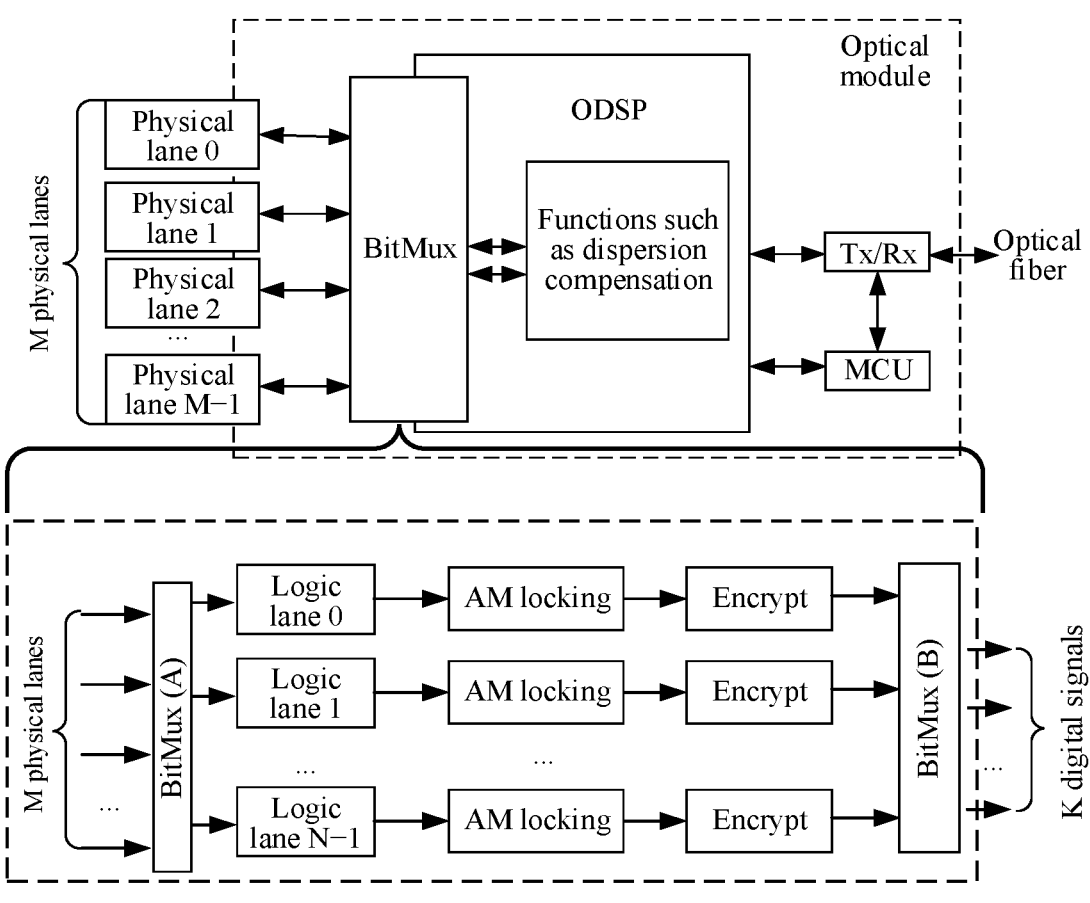
FIG. 6a is a schematic diagram of an encryption process of an optical module according to an embodiment of this application.

(1) The encryption solution in embodiments of this application may be deployed in the BitMux of the optical module, and the MCU may control encryption of data in a conversion process of a plurality of logic lane signals in the BitMux. FIG. 6$a$ is a schematic diagram of an encryption process of an optical module according to an embodiment of this application. M physical lane signals are obtained by using an optical module, and the M physical lane signals (for example, a physical lane 0 to a physical lane M−1 in the figure) are converted into N logic lane signals (for example, a logic lane 0 to a logic lane N−1 in the figure) by using a BitMux (A) in the BitMux according to a specified ratio such as M:N. The N logic lane signals include plaintext data, and the N logic lane signals may also be referred to as N plaintext data streams. The MCU may generate N ciphertext data streams based on the N plaintext data streams. Further, the N ciphertext data streams are converted into K digital signals that can be inputted into the ODSP through a BitMux (B) in the BitMux. Optionally, the MCU may configure and update encryption parameters required by an encryption module, where the encryption parameters include key encryption parameters such as an initialization vector (IV) and a key identification. Optionally, corresponding functional modules such as an AM lock module and an encryption/decryption module may be deployed in the BitMux of the optical module. Specifically, an AM lock module and an encryption/decryption module may be separately deployed for each logic lane. For one plaintext data stream corresponding to each logic lane, the AM lock module may be configured to insert encryption parameters into an AM in the plaintext data stream, and the encryption/decryption module may be configured to encrypt the plaintext data stream based on the encryption parameters, to obtain a ciphertext data stream. Specifically, the MCU may configure the IV at the first startup, and subsequently the encryption/decryption module automatically updates the IV according to a specified rule. The MCU configures and modifies the key identification. The AM lock module is responsible for locking the AM in the logic lane and using the locked AM to carry the latest encryption parameters.

Figure 6B:
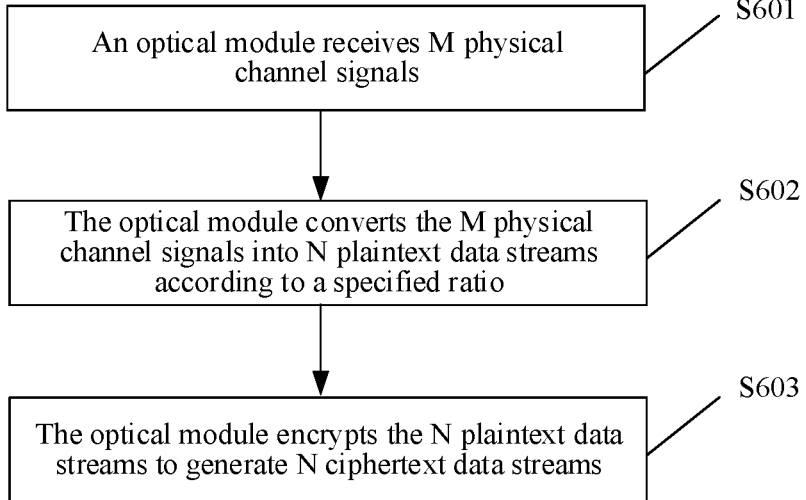
FIG. 6b is a schematic flowchart of a data encryption method according to an embodiment of this application.

FIG. 6b is a schematic flowchart of a data encryption method according to an embodiment of this application. For a manner of generating the N ciphertext data streams in the optical module, refer to steps S601 to S603 for implementation.

S601: The optical module receives M physical lane signals, where M is a positive integer.

S602: The optical module converts the M physical lane signals into N plaintext data streams according to a specified ratio.

S603: The optical module encrypts the N plaintext data streams to generate N ciphertext data streams. A first ciphertext data stream is any ciphertext data stream in the N ciphertext data streams. The first ciphertext data stream includes at least two first alignment markers (AMs) and at least two ciphertext data segments. One ciphertext data segment is included between every two first AMs. One first AM is included between every two ciphertext data segments. The at least two first AMs are used for aligning data of the N ciphertext data streams. Some or all of the first AMs in the at least two first AMs indicate encryption parameters of the at least two ciphertext data segments. M and N are both positive integers. It should be noted that, in a case in which the optical module can directly obtain the logic lane signals, S601 and S602 may not be performed, that is, S601 and S602 are not mandatory steps. The optical module may directly generate the N ciphertext data streams without converting the physical lane signals into the logic lane signals, which also falls within the protection scope of embodiments of this application. This is not limited in embodiments of this application.

The first plaintext data stream is any plaintext data stream in the N plaintext data streams. Based on this, that the optical module encrypts the N plaintext data streams includes: the optical module generates the first ciphertext data stream based on the first plaintext data stream and the encryption parameters of the at least two ciphertext data segments.

In an optional implementation, the first plaintext data stream includes at least two second AMs and at least two plaintext data segments, one plaintext data segment is included between every two second AMs, one second AM is included between every two plaintext data segments, and the at least two second AMs are used for aligning data of the N plaintext data streams. That the optical module generates the first ciphertext data stream may be implemented in the following manner: The optical module encrypts the at least two plaintext data segments in the first plaintext data stream based on the encryption parameters of the at least two ciphertext data segments, to obtain the at least two ciphertext data segments in the first ciphertext data stream. The optical module processes the at least two second AMs in the first plaintext data stream based on the encryption parameters of the at least two ciphertext data segments, to obtain the at least two first AMs in the first ciphertext data stream.

Optionally, for the first ciphertext data stream, the optical module may indicate the encryption parameters in the following manner: the optical module selects a first AM set from the at least two first AMs, where the first AM is used for carrying an encryption parameter of at least one specified ciphertext data segment. The first AM set includes L first AMs, and L is a positive integer. Optionally, there is a one-to-one mapping relationship between L first AMs included in the first AM set in the first ciphertext data stream and L second AMs at same positions in the first plaintext data stream.

A distribution manner of the first AM set and the at least one specified ciphertext data segment is described below in detail.

Distribution manner (1): the optical module may divide the at least two first AMs into a plurality of AM sets, and the first AM set is any AM set in the plurality of AM sets. The at least one specified ciphertext data segment includes the first ciphertext data segment following each first AM in a target AM set.

Optionally, the target AM set may be a first AM set, or the target AM set may be a second AM set, and the second AM set may precede or follow the first AM set. There may be one or more AM sets between the second AM set and the first AM set. Alternatively, the second AM set and the first AM set may be consecutive. In other words, the second AM set may be following the first AM set, or the second AM set may be the last AM set preceding the first AM set. Alternatively, it may be understood that the first AM set is an $i^{th}$ AM set included in the first ciphertext data stream, and the target AM set is an $(i\pm x)^{th}$ AM set included in the first ciphertext data stream. The $i^{th}$ AM set carries an encryption parameter of at least one specified ciphertext data segment, and the at least one specified ciphertext data segment is the first ciphertext data segment following each first AM in the $(i\pm x)^{th}$ AM set. i is less than L, x is a natural number, and "$\pm$" represents an operator of an addition operation (+) or a subtraction operation (−).

Optionally, the encryption parameters carried in the first AM set include an initialization vector (IV) and a key identification, and the key identification is used for identifying an encryption key shared by a transmitting end and a receiving end. The optical module may determine, based on the IV, a length of the key identification, and/or a specified quantity of redundancy times, a quantity of first AMs included in the first AM set, that is, a value of L. A specific carrying manner is as follows: p first AMs in the first AM set are used for carrying the initialization vector IV that is repeated m times; and q first AMs in the first AM set are used for carrying the key identification that is repeated n times. q is a positive integer less than L, and p is a positive integer less than L. m and n both natural numbers, and values of m and n may be the same or different. If m/n is 0, it indicates that data is not repeated. For example, if m is 0, it indicates that IVs carried by the p first AMs appear only once, and if n is 0, it indicates that key identifications carried by the q first AMs appear only once. If m/n is greater than 0, it indicates that data repeatedly appears. For example, if m is 1, it indicates that the IVs carried by the p first AMs appear twice, and if n is 1, it indicates that the key identifications carried by the q first AMs appear twice. For example, if m is 2, it indicates that the IVs carried by the p first AMs appear three times, and if n is 2, it indicates that the key identifications carried by the q first AMs appear three times. Optionally, the MCU may further select r first AMs from the first AM set to carry an identifier of the first AM set, indicating a start of one AM set, and identifiers of different AM sets may be the same or different. r is a positive integer less than L. Optionally, with reference to the AM coding schemes shown in Table 1 and Table 2, related parameters may be carried based on UP0 to UP2 in the first AM.

Figure 7A:
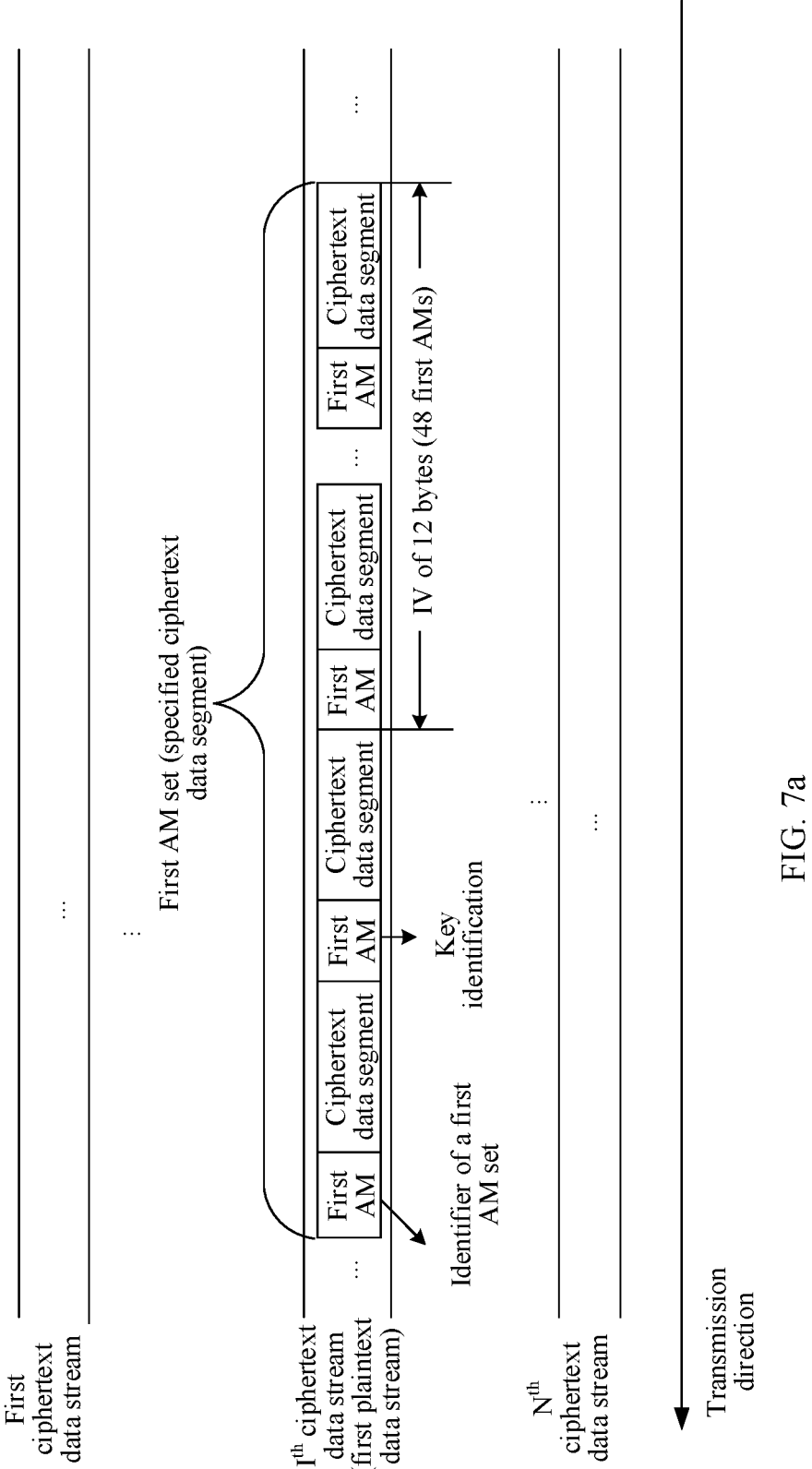
FIG. 7a is a schematic diagram 1 of an encryption parameter distribution structure according to an embodiment of this application.
Figure 7B:
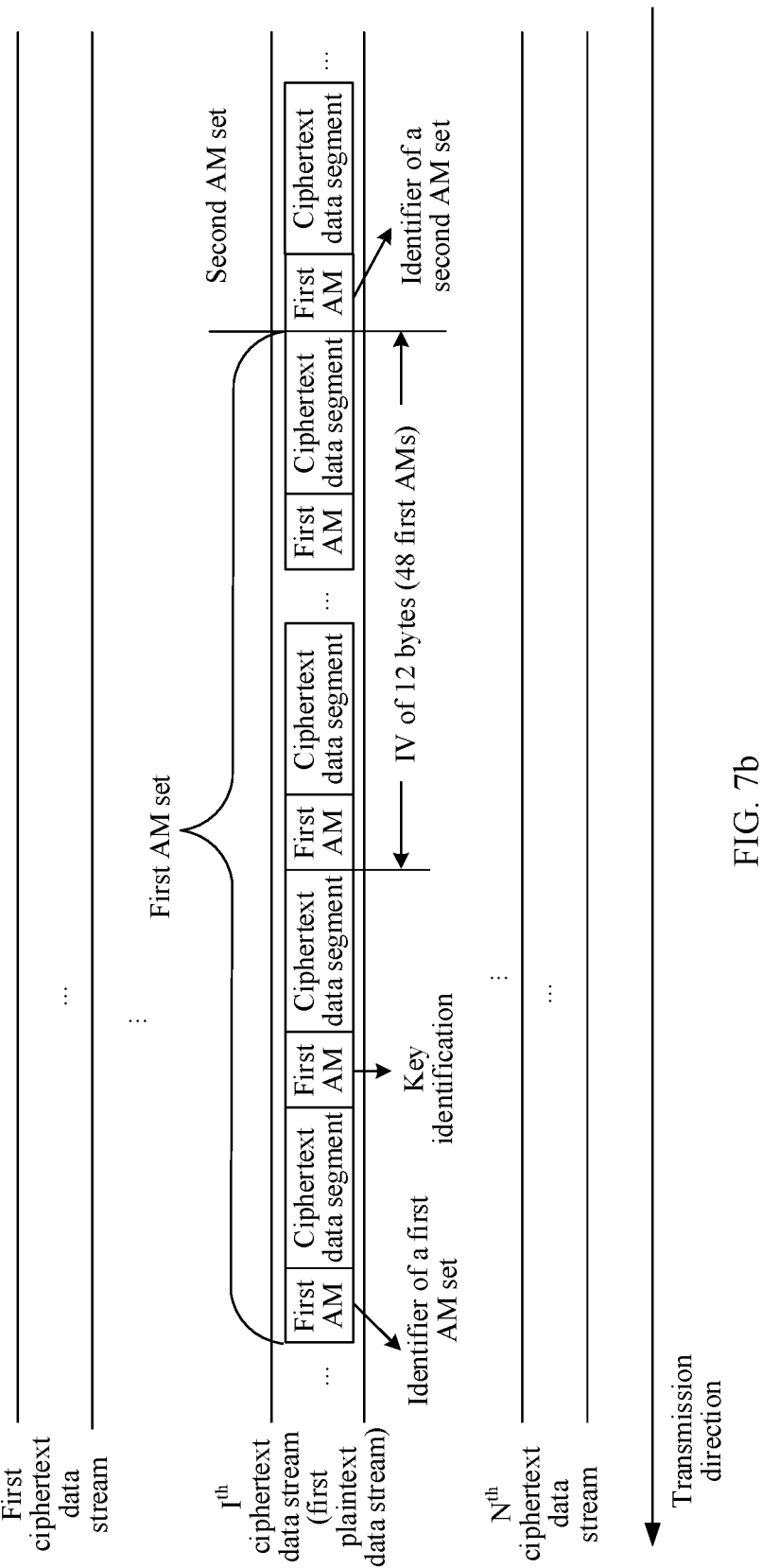
FIG. 7b is a schematic diagram 2 of an encryption parameter distribution structure according to an embodiment of this application.

For example, FIG. 7a/FIG. 7b is a schematic diagram of an encryption parameter distribution structure. It is assumed that $UP_0$, $UP_1$, and $UP_2$ in each first AM have a total of 24 bits, and one first AM may be used for carrying the identifier of the first AM set. The length of the key identification is 2 bits and is repeated 11 times. Therefore, one first AM is required to indicate a key identification that is repeated 11 times, and the key identification that is repeated 11 times may also be understood as 12 same key identifications. A length of an IV is 12 bytes, and a length of each byte is 8 bits, and the IV is repeated 11 times. Therefore, 48 first AMs are required to indicate the IV that is repeated 11 times. The IV that is repeated 11 times can be regarded as 12 identical IVs. Therefore, the first AM set includes 50 first AMs. That is, a value of L is 50, a value of p is 48, a value of m is 11, a value of q is 1, a value of n is 11, and a value of r is 1. The first AM set is any AM set in a plurality of AM sets included in the first ciphertext data stream, distribution structures of the plurality of AM sets are the same, and the distribution structure of the first AM set in FIG. 7a/FIG. 7b may be used.

FIG. 7a further shows that the at least one specified ciphertext data segment includes the first ciphertext data segment following each first AM in the first AM set. FIG. 7b further shows that the second AM set is the first AM set following the first AM set, and the at least one specified ciphertext data segment includes the first ciphertext data segment following each first AM in the second AM set. The second AM set has a same distribution structure as the first AM set, and a specific structure of the second AM set is omitted in FIG. 7b.

Optionally, a 2-bit value "10" may be used to represent an identifier of an AM set. In this case, fields $UP_0$, $UP_1$, and $UP_2$ in the first first AM in the first AM set have a total of 24 bits, and may be used for carrying 12 "10 s": a binary value of bit 0 to bit 7 of $UP_0$ is "10101010", a binary value of bit 0 to bit 7 of $UP_1$ is "10101010", and a binary value of bit 0 to bit 7 of $UP_2$ is "10101010", indicating that the identifier of the first AM set is repeated 11 times. Specifically, a 2-bit value "10" or "01" may be used to represent a key identification. In this case, $UP_0$, $UP_1$, and $UP_2$ in the second first AAM in the firstAM set have a total of 24 bits, and may be used for carrying 12 "10 s", indicating that the key identification is repeated 11 times: a binary value of bit 0 to bit 7 of $UP_0$ is "10101010", a binary value of bit 0 to bit 7 of $UP_1$ is "10101010", and a binary value of bit 0 to bit 7 of $UP_2$ is "10101010". Alternatively, the fields $UP_0$, $UP_1$, and $UP_2$ in the second first AM in the first AM set have a total of 24 bits, and may be used for carrying 12 "01 s", indicating that the key identification is repeated 11 times: a binary value of bit 0 to bit 7 of $UP_0$ is "01010101", a binary value of bit 0 to bit 7 of $UP_1$ is "01010101", and a binary value of bit 0 to bit 7 of $UP_2$ is "01010101". In this way, the remaining 48 first AMs in the first AM set carry 11 repeated IVs, that is, 12 same IVs.

Figure 7C:
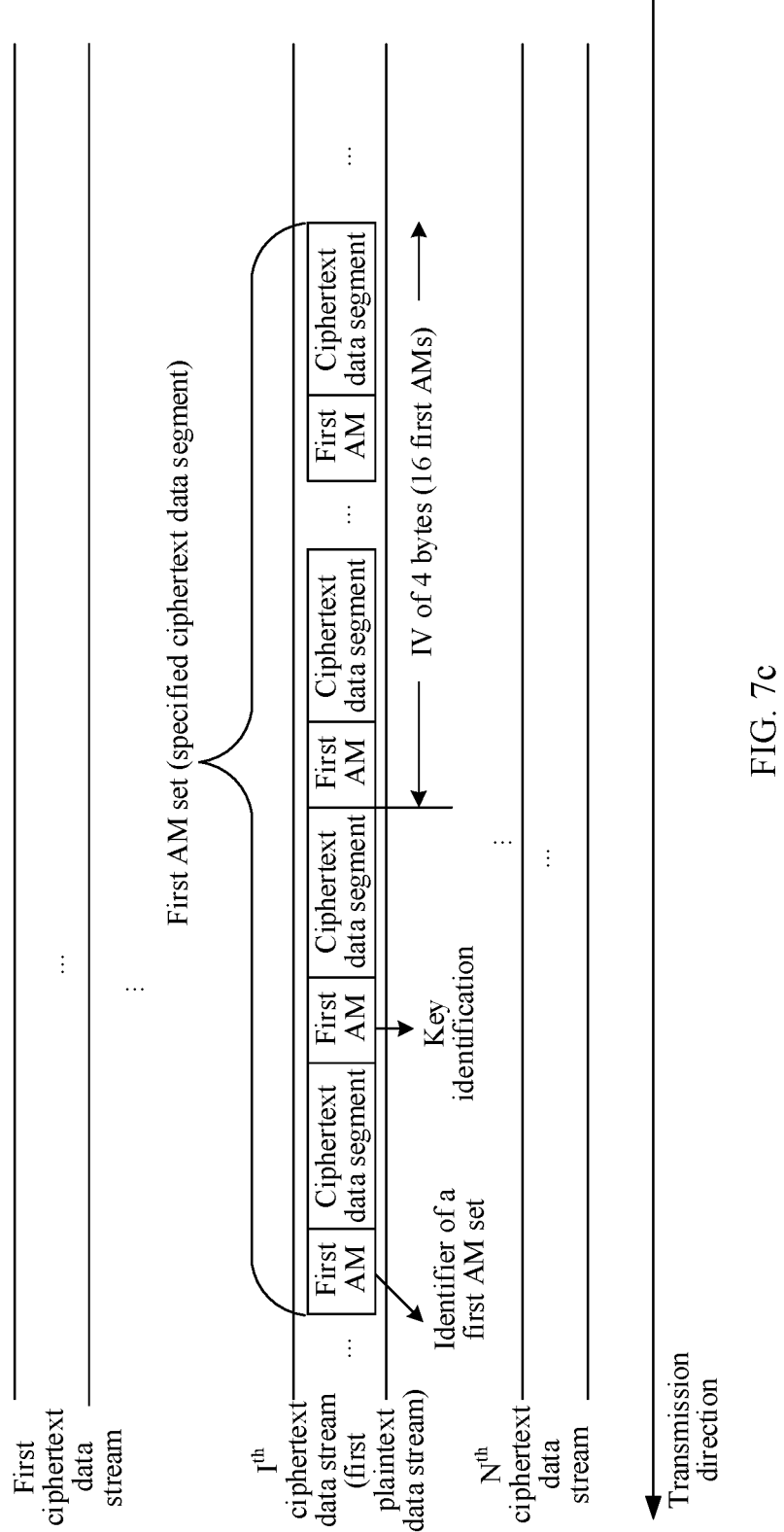
FIG. 7c is a schematic diagram 3 of an encryption parameter distribution structure according to an embodiment of this application.
Figure 7D:
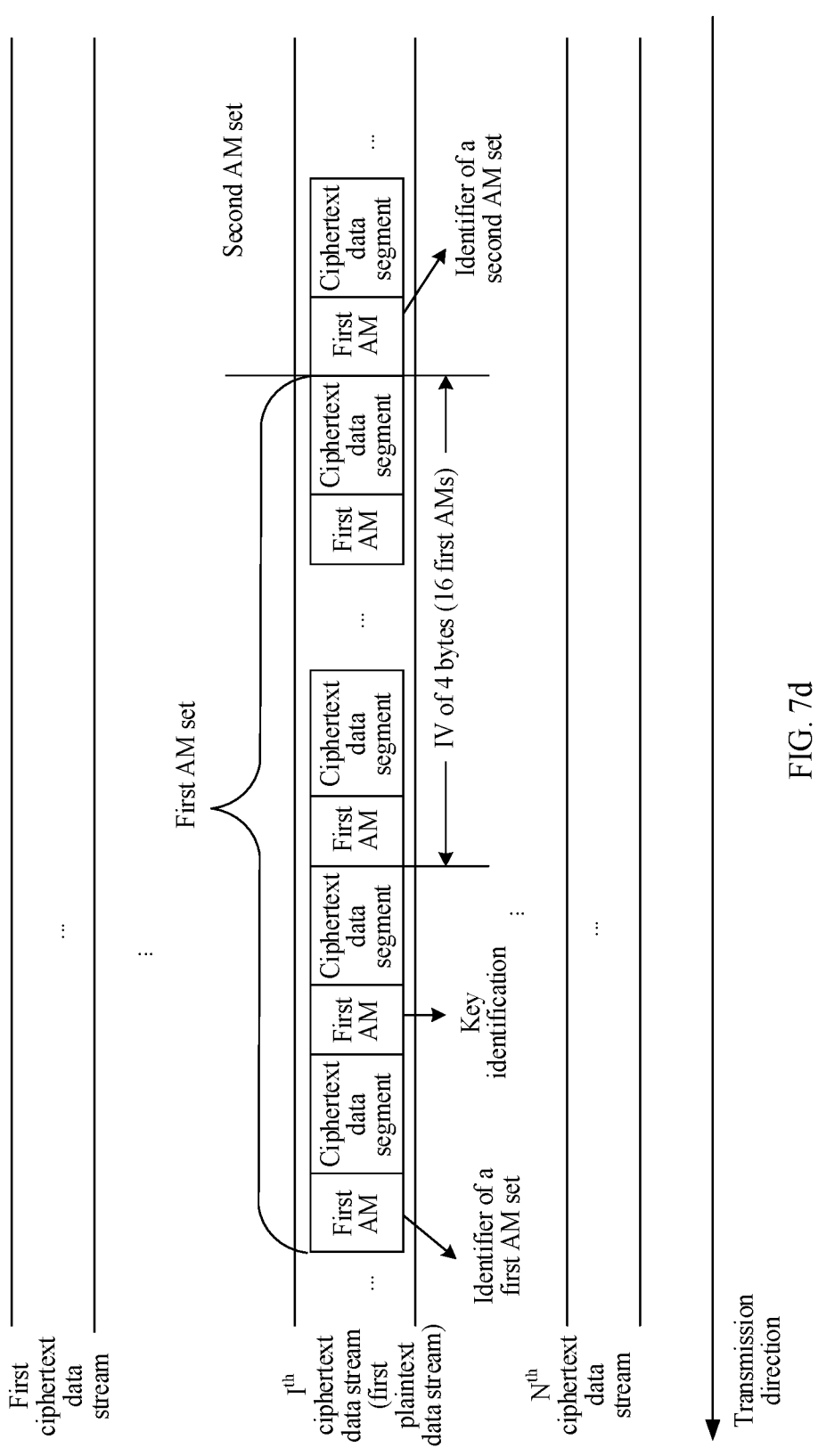
FIG. 7d is a schematic diagram 4 of an encryption parameter distribution structure according to an embodiment of this application.

For example, with reference to FIG. 7c/FIG. 7d, it is assumed that fields $UP_0$, $UP_1$, and $UP_2$ in each first AM have a total of 24 bits, and one first AM may be used for carrying the identifier of the first AM set. The length of the key identification is 2 bits and is repeated 11 times. Therefore, one first AM is required to indicate a key identification that is repeated 11 times, and the key identification that is repeated 11 times may also be understood as 12 same key identifications. A length of an IV is 4 bytes, a length of each byte is 8 bits, and the IV is repeated 11 times. Therefore, 16 first AMs are required to indicate the IV that is repeated 11 times. The IV that is repeated 11 times can be regarded as 12 identical IVs. Therefore, the first AM set includes 18 first AMs. That is, a value of L is 18, a value of p is 48, a value of m is 11, a value of q is 1, a value of n is 11, and a value of r is 1. The first AM set is any AM set in a plurality of AM sets included in the first ciphertext data stream, distribution structures of the plurality of AM sets are the same, and the distribution structure of the first AM set in FIG. 7c/FIG. 7d may be used.

FIG. 7c further shows that the at least one specified ciphertext data segment includes the first ciphertext data segment following each first AM in the first AM set. FIG. 7d further shows that the second AM set is the first AM set following the first AM set, and the at least one specified ciphertext data segment includes the first ciphertext data segment following each first AM in the second AM set. The second AM set has a same distribution structure as the first AM set, and a specific structure of the second AM set is omitted in FIG. 7d.

Optionally, a 2-bit value "10" may be used to represent an identifier of an AM set. In this case, fields $UP_0$, $UP_1$, and $UP_2$ in the first first AM in the first AM set have a total of 24 bits, and may be used for carrying 12 "10 s": a binary value of bit 0 to bit 7 of $UP_0$ is "10101010", a binary value of bit 0 to bit 7 of $UP_1$ is "10101010", and a binary value of bit 0 to bit 7 of $UP_2$ is "10101010", indicating that the identifier of the first AM set is repeated 11 times. Specifically, a 2-bit value "10" or "01" may be used to represent a key identification. In this case, $UP_0$, $UP_1$, and $UP_2$ in the second first AM in the first AM set have a total of 24 bits, and may be used for carrying 12 "10 s", indicating that the key identification is repeated 11 times: a binary value of bit 0 to bit 7 of $UP_0$ is "10101010", a binary value of bit 0 to bit 7 of $UP_1$ is "10101010", and a binary value of bit 0 to bit 7 of $UP_2$ is "10101010". Alternatively, the fields $UP_0$, $UP_1$, and $UP_2$ in the second first AM in the first AM set have a total of 24 bits, and may be used for carrying 12 "01 s", indicating that the key identification is repeated 11 times: a binary value of bit 0 to bit 7 of $UP_0$ is "01010101", a binary value of bit 0 to bit 7 of $UP_1$ is "01010101", and a binary value of bit 0 to bit 7 of $UP_2$ is "01010101". In this way, the remaining 16 first AMs in the first AM set carry 11 redundant IVs, that is, 12 same IVs.

It is assumed that a bit error ratio of a lane is $BER=1E^-4$. Reliability of each bit is 1-BER. For redundancy of 11 times, a probability that a quantity of correct bits in the 12 bits is greater than or equal to 7

$$P = \sum_{i=7}^{12} \binom{i}{12}(1 - BER)^i BER^{12-i}.$$

A correctness probability of an identifier of an AM set is equal to $P^2$. A correctness probability of a key identification is equal to $P^2$. A correctness probability of an IV is equal to $P^{96}$. Considering a time period in which an AM appears on each logic lane, an error occurs in an identifier of an AM set and a key index once in over hundreds of thousands of years, and an error occurs in an IV once in about ten thousand years, so that the reliability is extremely high.

Distribution manner (2): the at least one specified ciphertext data segment includes at least one ciphertext data segment following a specified AM, and the specified AM is a first AM that is in the first ciphertext data stream and that follows the first AM set.

Optionally, for a manner in which the first AM carries the encryption parameters, refer to the distribution manner (1). Details are not described again in embodiments of this application.

Figure 8:
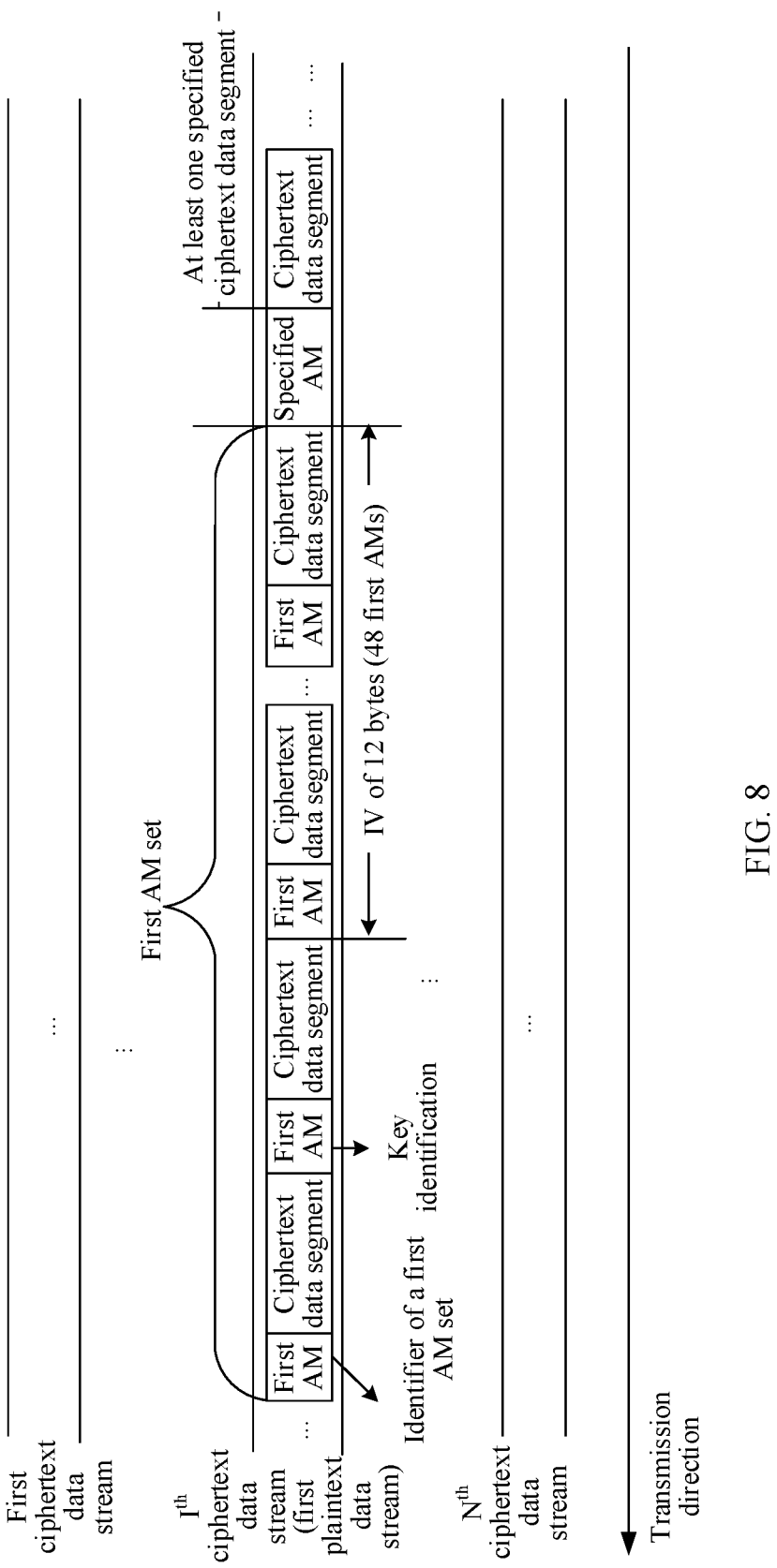
FIG. 8 is a schematic diagram 5 of an encryption parameter distribution structure according to an embodiment of this application.

For example, with reference to FIG. 8, it is assumed that $UP_0$, $UP_1$, and $UP_2$ in each first AM have a total of 24 bits, and one first AM may be used for carrying the identifier of the first AM set. The length of the key identification is 2 bits and is repeated 11 times. Therefore, one first AM is required to indicate a key identification that is repeated 11 times, and the key identification that is repeated 11 times may also be referred to as 12 same key identifications. A length of an IV is 12 bytes, and a length of each byte is 8 bits, and the IV is repeated 11 times. Therefore, 48 first AMs are required to indicate the IV that is repeated 11 times. The IV that is repeated 11 times may be referred to as 12 identical IVs. Therefore, the first AM set includes 50 first AMs. That is, a value of L is 50, a value of p is 48, a value of m is 11, a value of q is 1, a value of n is 11, and a value of r is 1. The encryption parameters carried in the first AM set are encryption parameters of all ciphertext data segments following the specified AM shown in FIG. 8. For an optional manner in which the first AM carries the encryption parameters, refer to the optional implementation in FIG. 7a/FIG. 7b. Details are not described in embodiments of this application again.

Distribution manner (3): For the first ciphertext data stream, the optical module selects a plurality of AM sets from the first ciphertext data stream. Each AM set includes L first AMs, and a specified quantity (for example, S, where S is a positive integer) of ciphertext data segments are included between every two AM sets. The first AM set is any AM set in the plurality of AM sets selected by the optical module. The second AM set is a first AM set following the first AM set. The at least one specified ciphertext data segment includes at least one ciphertext data segment between the first AM set and the second AM set.

Optionally, for a manner in which the first AM carries the encryption parameters, refer to the distribution manner (1). Details are not described again in embodiments of this application.

Figure 9:
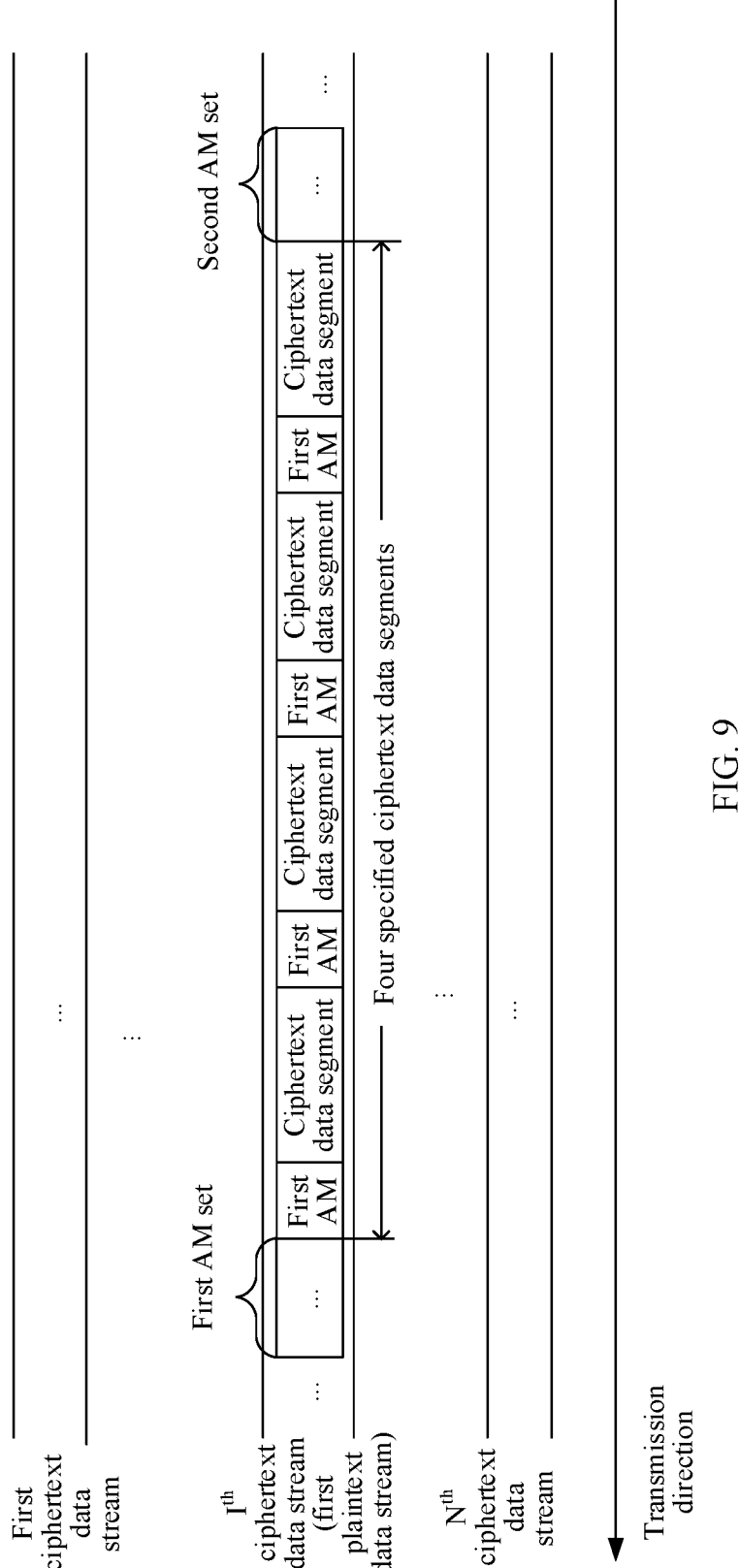
FIG. 9 is a schematic diagram 6 of an encryption parameter distribution structure according to an embodiment of this application.

For example, FIG. 9 is a schematic diagram of a distribution structure according to an embodiment of this application. It is assumed that $UP_0$, $UP_1$, and $UP_2$ in each first AM have a total of 24 bits, and one first AM may be used for carrying the identifier of the first AM set. The length of the key identification is 2 bits and is repeated 11 times. Therefore, one first AM is required to indicate a key identification that is repeated 11 times, and the key identification that is repeated 11 times may also be referred to as 12 same key identifications. A length of an IV is four bytes, a length of each byte is 8 bits, and the IV is repeated 11 times. Therefore, 16 first AMs are required to indicate the IV that is repeated 11 times. The IV that is repeated 11 times may be referred to as 12 identical IVs. Therefore, the first AM set includes 18 first AMs. That is, a value of L is 18, a value of p is 48, a value of m is 11, a value of q is 1, a value of n is 11, and a value of r is 1. A distribution structure of the second AM set is the same as the distribution structure of the first AM set, but encryption parameters carried in the second AM set may be different from the encryption parameters carried in the first AM set. The encryption parameters carried in the first AM set are encryption parameters of five ciphertext data segments between the first AM set and the second AM set shown in FIG. 9. For the distribution structures inside the first AM set and the second AM set in FIG. 9, refer to the distribution structure of the first AM set in FIG. 7c/FIG. 7d. Details are not shown in FIG. 9. For an optional manner in which the first AM carries the encryption parameters, refer to the optional implementation in FIG. 7c/FIG. 7d. Details are not described in embodiments of this application again.

A manner of encrypting the at least one specified ciphertext data segment is described below in detail. The at least one specified ciphertext data segment corresponds to at least one specified plaintext data segment at a same position in the first plaintext data stream. A transmitting end and a receiving end are deployed with a same first encryption algorithm, for example, advanced encryption standard-galois/counter mode (advanced encryption standard-galois/counter mode, AES-GCM) or CHACHA20-PLOY1305. The optical module used in the transmitting end may generate an encrypted character string based on the first encryption algorithm and the encryption parameter (for example, the IV and the key identification) carried in the first AM set. A length of an encrypted character string is the same as a length of a specified plaintext data segment. For each specified plaintext data segment in the at least one specified plaintext data segment, the optical module may perform an exclusive-OR operation on the encrypted character string and the specified plaintext data segment to obtain a specified ciphertext data segment corresponding to the specified plaintext data segment.

Figure 10A:
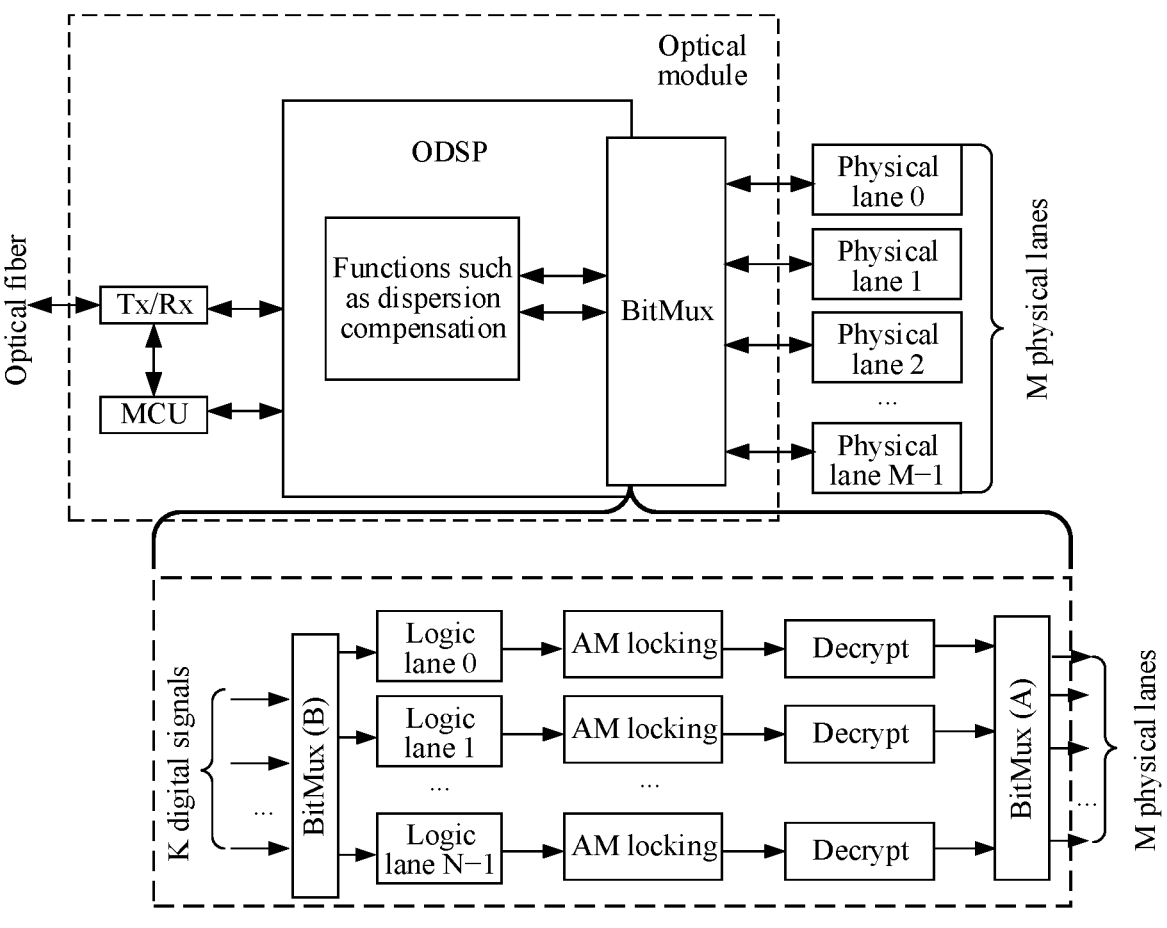
FIG. 10a is a schematic diagram of a decryption process of an optical module according to an embodiment of this application.

(2) The decryption solution in embodiments of this application may be deployed in the BitMux of the optical module, and the MCU may control decryption of data in a conversion process of a plurality of logic lane signals in the BitMux. FIG. 10a is a schematic diagram of a decryption process of an optical module according to an embodiment of this application. K digital signals are restored, by using the ODSP, from the optical signal received by the optical module. The BitMux (B) in the BitMux converts the K digital signals into N ciphertext data streams, locks the N ciphertext data streams based on the AM lock module deployed in the BitMux, and decrypts (decryption) the N ciphertext data streams based on the encryption/decryption module deployed in the BitMux, to obtain N plaintext data streams. The N plaintext data streams are also referred to as N logic lane signals (for example, logic lanes 0 to N−1 in the figure), and a BitMux (A) in the BitMux restores the N logic lane signals into M physical lane signals (for example, physical lanes 0 to M−1 in the figure) according to a specified ratio such as M:N. The optical module transmits the M physical lane signals to an electrical chip at a physical layer.

Figure 10B:
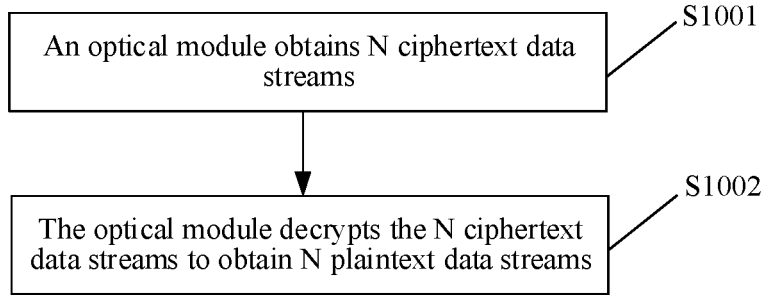
FIG. 10b is a schematic flowchart of a data decryption method according to an embodiment of this application

FIG. 10b is a schematic flowchart of a data decryption method according to an embodiment of this application. For a manner of restoring the N plaintext data streams in the optical module, refer to steps S1001 and S1002 for implementation.

S1001: The optical module obtains N ciphertext data streams, where a first ciphertext data stream is any ciphertext data stream in the N ciphertext data streams, the first ciphertext data stream includes at least two first alignment markers (AMs) and at least two ciphertext data segments, one ciphertext data segment is included between every two firstAMs, one first AM is included between every two ciphertext data segments, the at least two first AMs are used for aligning data of the N ciphertext data streams, some or all of the first AMs in the at least two first AMs indicate encryption parameters of the at least two ciphertext data segments, and N is a positive integer.

S1002: The optical module decrypts the N ciphertext data streams to obtain N plaintext data streams.

Specifically, the optical module decrypts the first ciphertext data stream based on the encryption parameters of the at least two ciphertext data segments, to obtain a first plaintext data stream, where the first plaintext data stream is any plaintext data stream in N plaintext data streams. The first plaintext data stream includes at least two second AMs and at least two plaintext data segments, one plaintext data segment is included between every two second AMs, one second AM is included between every two plaintext data segments, and the at least two second AMs are used for aligning data of the N plaintext data streams. Optionally, the optical module may decrypt the at least two ciphertext data segments in the first ciphertext data stream based on the encryption parameters of the at least two ciphertext data segments, to obtain at least two plaintext data segments in the first plaintext data stream; and process the at least two first AMs in the first ciphertext data stream based on the encryption parameters of the at least two ciphertext data segments, to obtain at least two second AMs in the first plaintext data stream.

Optionally, if the first ciphertext data stream includes a first AM set (set), the first ciphertext data stream includes a first AM set, and the first AM set includes L first AMs, the first AM set is used for carrying an encryption parameter of at least one specified ciphertext data segment. L is a positive integer. Optionally, the encryption parameter carried in the first AM set includes an initialization vector (IV) and a key identification; p first AMs in the first AM set are used for carrying the initialization vector IV that is repeated m times, where p is a positive integer less than L, and m is a natural number; and q first Ams in the first AM set are used for carrying the key identification that is repeated n times, where q is a positive integer less than L, and n is a natural number. r first Ams in the first AM set are used for carrying an identifier of the first AM set, and r is a positive integer less than L. In an optional implementation, a value of L is 50, a value of p is 48, a value of m is 11, a value of q is 1, a value of n is 11, and a value of r is 1.

The optical module may decrypt the at least one specified ciphertext data segment based on the encryption parameter carried in the first AM set, to obtain a plaintext data segment corresponding to the at least one specified ciphertext data segment. For details, refer to the following steps S21 to S24.

S21: The optical module may extract the encryption parameters from the first AM set.

Optionally, the optical module may perform validity verification on the received encryption parameters in the first AM set. For example, if the first AM carries an IV that is repeated 11 times and a key identification that is repeated 11 times, the optical transceiver may extract the 12 same Ivs and the 12 same key identifications from the first AM set. Next, if at least seven of the 12 same Ivs are correctly transmitted, it is determined that at least seven of the 12 same key identifications are correctly transmitted, and the optical module may determine that the received encryption parameters in the first AM set are valid. Specifically, an example in which the IV is repeated 11 times and the length of the IV is four bytes, that is, 32 bits, is used. The optical module may extract, from the first AM set, the IV that is repeated 11 times, that is, 32*12 bits. The bit sequence is divided into 12 segments in sequence, each segment of the bit sequence includes 32 bits, and each segment of the bit sequence represents one IV. The optical module may compare, in a multi-bit determining manner, whether the bits in the 12 bit sequences are the same. If the bits in seven or more bit sequences are the same, the optical module may determine that the received encryption parameters in the first AM set are valid.

S22: The optical module locates at least one specified ciphertext data segment based on the first AM set and a distribution manner of the specified ciphertext data segment.

For example, in the foregoing distribution manner (1): the at least one specified ciphertext data segment includes the first ciphertext data segment following each first AM in the first AM set. Distribution manner (2): the at least one specified ciphertext data segment includes at least one ciphertext data segment following a specified AM, and the specified AM is a first AM that is in the first ciphertext data stream and that follows the first AM set. Distribution manner (3): the at least one specified ciphertext data segment includes at least one ciphertext data segment between the first AM set and the second AM set, and a specified quantity (for example, S, where S is a positive integer) of ciphertext data segments are included between the second AM set and the first AM set.

S23: The optical module decrypts the at least one specified ciphertext data segment based on the encryption parameter carried in the first AM set, to obtain at least one specified plaintext data segment. There is a one-to-one correspondence between the at least one specified plaintext data segment and the at least one specified plaintext data segment.

Specifically, a same first encryption algorithm, for example, AES-GCM and CHACHA20-PLOY1305, is deployed at a transmitting end and a receiving end. The optical module used in the receiving end may generate an encrypted character string based on the first encryption algorithm and the encryption parameter carried in the first AM set. A length of an encrypted character string is the same as a length of a specified ciphertext data segment. For each specified ciphertext data segment in the at least one specified ciphertext data segment, the optical module may perform an exclusive-OR operation on the encrypted character string and the specified ciphertext data segment to obtain a specified plaintext data segment corresponding to the specified ciphertext data segment.

S24: The optical module restores the at least two second AMs in the first plaintext data stream from the at least two first AMs in the first ciphertext data stream. Specifically, the optical module may replace content in UP0 to UP2 in the first AM with a value specified in the IEEE 802.3 specification.

An encryption solution and a decryption solution that are applied to a physical layer chip and that are provided in embodiments of this application are described below in detail.

For the physical layer chip used in the transmitting end, when distributing the serial stream into the N logic lane signals, the physical layer chip may encrypt the N logic lane signals to generate the N ciphertext data streams. For a specific manner of generating the N ciphertext data streams, refer to the foregoing encryption manner of the foregoing optical module. Details are not described again. The N ciphertext data streams generated by the physical layer chip may be sent through a medium. For example, the N ciphertext data streams generated by the physical layer chip may be converted into optical signals by using an optical module and sent.

For the physical layer chip used in the receiving end, the physical layer chip may obtain M encrypted physical lane signals by using a medium (for example, an optical module), and convert, based on the BitMux built in the PMA, the N encrypted logic lane signals, that is, the N ciphertext data streams. In this case, the physical layer chip may decrypt the N ciphertext data streams to obtain the N plaintext data streams.

Figures 11, 12:
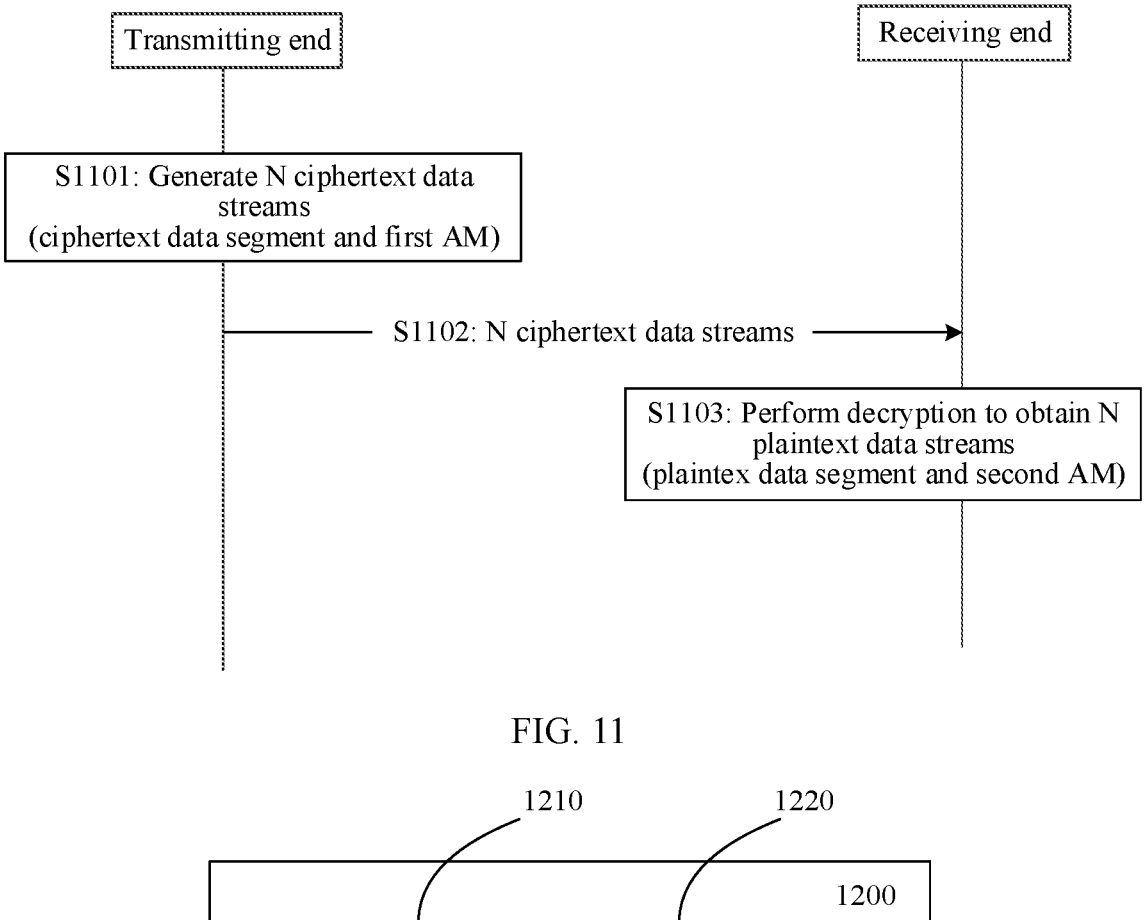
FIG. 11 is a schematic flowchart of a data transmission method according to an embodiment of this application.
FIG. 12 is a schematic diagram of a communication apparatus according to an embodiment of this application.

Based on the foregoing embodiments, an embodiment of this application further provides a data transmission method. With reference to FIG. 11, the method includes the following procedure.

S1101: A transmitting end generates N ciphertext data streams. A first ciphertext data stream is any ciphertext data stream in the N ciphertext data streams. The first ciphertext data stream includes at least two first alignment markers AMs and at least two ciphertext data segments. One ciphertext data segment is included between every two first AMs. One first AM is included between every two ciphertext data segments. The at least two first AMs are used for aligning data of the N ciphertext data streams. Some or all of the first AMs in the at least two first AMs indicate encryption parameters of the at least two ciphertext data segments. N is a positive integer.

Optionally, the N ciphertext data streams may be generated by an optical module or a physical layer chip used in the transmitting end.

S1102: The transmitting end sends the N ciphertext data streams to a receiving end, and the receiving end receives the N ciphertext data streams from the transmitting end.

S1103: The receiving end decrypts the N ciphertext data streams to obtain N plaintext data streams.

Optionally, the optical module or the physical layer chip used in the receiving end may decrypt the N ciphertext data streams to obtain the N plaintext data streams.

Optionally, a first plaintext data stream is any plaintext data stream in the N plaintext data streams, the first plaintext data stream includes at least two second AMs and at least two plaintext data segments, one plaintext data segment is included between every two second AMs, one second AM is included between every two plaintext data segments, and the at least two second AMs are used for aligning data of the N plaintext data streams.

Based on a same concept, FIG. 12 is a schematic diagram of a structure of a communication apparatus according to an embodiment of this application. The apparatus is configured to implement steps performed by the corresponding communication apparatus in the foregoing embodiments. As shown in FIG. 12, an apparatus 1200 includes a transceiver unit 1210 and a processing unit 1220.

In a first embodiment, the communication apparatus is used in an optical module or a physical layer chip at a transmitting end, and is configured to implement an encryption function.

The processing unit 1220 (e.g., one or more processing circuits) is configured to generate N ciphertext data streams, where a first ciphertext data stream is any ciphertext data stream in the N ciphertext data streams, the first ciphertext data stream includes at least two first alignment markers (AMs) and at least two ciphertext data segments. One ciphertext data segment is included between every two first AMs. One first AM is included between every two ciphertext data segments. The at least two first Ams are used for aligning data of the N ciphertext data streams. Some or all of the first Ams in the at least two first Ams indicate encryption parameters of the at least two ciphertext data segments. N is a positive integer.

The transceiver unit 1210 (e.g., transceiver, or a transmitter and a receiver) is configured to send the N ciphertext data streams.

In embodiments of this application, a data stream (or referred to as a bit stream) at a physical layer is encrypted and transmitted. An encryption parameter is indicated based on an AM, and a transmitted data stream does not occupy user service bandwidth, so that a data transmission amount can be increased, to increase a data transmission rate. In addition, all bits (including a source MAC address and a destination MAC address) in an Ethernet frame can be encrypted, so that address information is not exposed, and security can be improved.

In an optional implementation, the first ciphertext data stream includes a first AM set, the first AM set includes L first AMs, the first AM set is used for carrying an encryption parameter of at least one specified ciphertext data segment, and L is a positive integer.

In an optional implementation, the encryption parameter carried in the first AM set includes an initialization vector (IV) and a key identification; p first AMs in the first AM set are used for carrying the initialization vector IV that is repeated m times, where p is a positive integer less than L, and m is a natural number; and q first AMs in the first AM set are used for carrying the key identification that is repeated n times, where q is a positive integer less than L, and n is a natural number.

In an optional implementation, r first AMs in the first AM set are used for carrying an identifier of the first AM set, and r is a positive integer less than L.

In an optional implementation, a value of L is 50, a value of p is 48, a value of m is 11, a value of q is 1, a value of n is 11, and a value of r is 1.

In an optional implementation, the at least one specified ciphertext data segment includes the first ciphertext data segment following each first AM in the first AM set.

In an optional implementation, the at least one specified ciphertext data segment includes at least one ciphertext data segment following a specified AM, and the specified AM is a first AM that is in the first ciphertext data stream and that follows the first AM set.

In an optional implementation, the processing unit 1220 is further configured to obtain N plaintext data streams, where a first plaintext data stream is any plaintext data stream in the N plaintext data streams, the first plaintext data stream includes at least two second AMs and at least two plaintext data segments, one plaintext data segment is included between every two second AMs, one second AM is included between every two plaintext data segments, and the at least two second AMs are used for aligning data of the N plaintext data streams. The processing unit 1220 is further configured to generate the first ciphertext data stream based on the first plaintext data stream and the encryption parameters of the at least two ciphertext data segments.

In an optional implementation, the processing unit 1220 is configured to: encrypt the at least two plaintext data segments in the first plaintext data stream based on the encryption parameters of the at least two ciphertext data segments, to obtain the at least two ciphertext data segments in the first ciphertext data stream; and process the at least two second AMs in the first plaintext data stream based on the encryption parameters of the at least two ciphertext data segments, to obtain the at least two first AMs in the first ciphertext data stream.

In an optional implementation, the transceiver unit 1210 is further configured to receive M physical lane signals, where M is a positive integer. The processing unit 1220 is further configured to convert the M physical lane signals into the N plaintext data streams according to a specified ratio.

In a second embodiment, the communication apparatus is used in an optical module or a physical layer chip at a receiving end, and is configured to implement a decryption function.

The transceiver unit 1210 is configured to obtain N ciphertext data streams, where a first ciphertext data stream is any ciphertext data stream in the N ciphertext data streams, the first ciphertext data stream includes at least two first alignment markers (AMs) and at least two ciphertext data segments, one ciphertext data segment is included between every two first AMs, one first AM is included between every two ciphertext data segments, the at least two first AMs are used for aligning data of the N ciphertext data streams, some or all of the first AMs in the at least two first AMs indicate encryption parameters of the at least two ciphertext data segments, and N is a positive integer. The transceiver unit 1210 is also configured to obtain the encryption parameters of the at least two ciphertext data segments.

The processing unit 1220 is configured to decrypt the first ciphertext data stream based on the encryption parameters of the at least two ciphertext data segments, to obtain a first plaintext data stream, where the first plaintext data stream is any plaintext data stream in N plaintext data streams.

In embodiments of this application, a data stream (or referred to as a bit stream) at a physical layer is encrypted and transmitted. An encryption parameter is indicated based on an AM, and a transmitted data stream does not occupy user service bandwidth, so that a data transmission amount can be increased, to increase a data transmission rate. In addition, all bits (including a source MAC address and a destination MAC address) in an Ethernet frame can be encrypted, so that address information is not exposed, and security can be improved.

In an optional implementation, the first plaintext data stream includes at least two second AMs and at least two plaintext data segments, one plaintext data segment is included between every two second AMs, one second AM is included between every two plaintext data segments, and the at least two second AMs are used for aligning data of the N plaintext data streams.

In an optional implementation, the processing unit 1220 is configured to: decrypt the at least two ciphertext data segments in the first ciphertext data stream based on the encryption parameters of the at least two ciphertext data segments, to obtain at least two plaintext data segments in the first plaintext data stream; and process the at least two first AMs in the first ciphertext data stream based on the encryption parameters of the at least two ciphertext data segments, to obtain at least two second AMs in the first plaintext data stream.

In an optional implementation, the first ciphertext data stream includes a first AM set, the first AM set includes L first AMs, the first AM set is used for carrying an encryption parameter of at least one specified ciphertext data segment, and L is a positive integer.

In an optional implementation, the encryption parameter carried in the first AM set includes an initialization vector IV and a key identification; p first AMs in the first AM set are used for carrying the initialization vector IV that is repeated m times, where p is a positive integer less than L, and m is a natural number; and q first AMs in the first AM set are used for carrying the key identification that is repeated n times, where q is a positive integer less than L, and n is a natural number.

In an optional implementation, r first AMs in the first AM set are used for carrying an identifier of the first AM set, and r is a positive integer less than L.

In an optional implementation, a value of L is 50, a value of p is 48, a value of m is 11, a value of q is 1, a value of n is 11, and a value of r is 1.

In an optional implementation, the at least one specified ciphertext data segment includes the first ciphertext data segment following each first AM in the first AM set.

In an optional implementation, the at least one specified ciphertext data segment includes at least one ciphertext data segment following a specified AM, and the specified AM is a first AM that is in the first ciphertext data stream and that follows the first AM set.

In an optional implementation, the processing unit 1220 is further configured to decrypt the at least one specified ciphertext data segment based on the encryption parameter carried in the first AM set, to obtain a plaintext data segment corresponding to the at least one specified ciphertext data segment.

Optionally, the communication apparatus 1200 may further include a storage unit. The storage unit is configured to store data or instructions (which may also be referred to as code or a program). The foregoing units may interact with or be coupled to the storage unit, to implement a corresponding method or function.

It should be understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, units may be separately disposed processing elements, or may be integrated into a chip of the apparatus for implementation. In addition, the units may be stored in a memory in a program form, and is invoked by a processing element of the apparatus to perform functions of the units. In addition, such units may be integrated together or may be individually implemented. The processing element herein may also be referred to as a processor, and may be an integrated circuit having a signal processing capability. During implementation, the steps in the foregoing methods or the foregoing units may be implemented by using a hardware integrated logic circuit in a processing element, or may be implemented in the form in which the processing element invokes software.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of the integrated circuit forms. In another example, when the unit in the apparatus may be implemented by scheduling a program by a processing element, the processing element may be a general-purpose processor, for example, a central processing unit (CPU) or another processor that can invoke the program. In still another example, the units may be integrated and implemented in a form of a system on a chip (SOC).

The foregoing transceiver unit 1210 is an interface circuit of the apparatus, and is configured to receive a signal from another apparatus or send a signal to another apparatus. For example, when the apparatus is implemented in a form of a chip, the transceiver unit 1210 is an interface circuit configured by the chip to receive a signal from another chip or apparatus and/or send a signal to another chip or apparatus.

Figure 13:
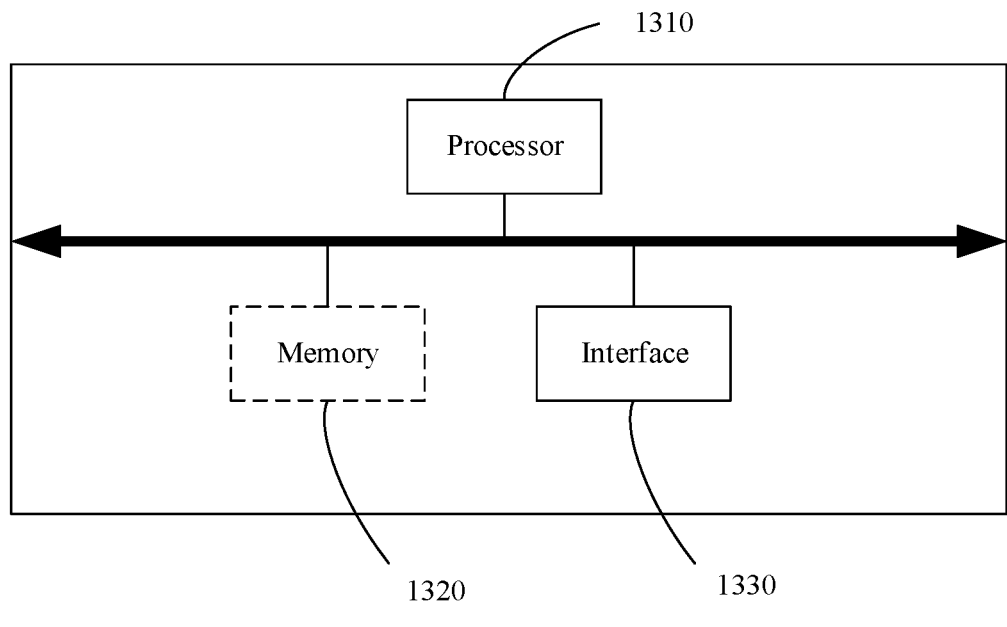
FIG. 13 is a schematic diagram of another communication apparatus according to an embodiment of this application.

FIG. 13 is a schematic diagram of another communication apparatus according to an embodiment of this application. The communication apparatus is configured to implement operations of the communication apparatus (for example, a communication apparatus in an optical module or a communication module in a physical layer chip) in the foregoing embodiments. As shown in FIG. 13, the communication apparatus includes a processor 1310 and an interface 1330. Optionally, the communication apparatus further includes a memory 1320. The interface 1330 is configured to implement communication with another device.

The methods performed by the communication apparatus in the foregoing embodiments may be implemented by the processor 1310 by invoking a program stored in a memory (which may be the memory 1320 in the communication apparatus, or may be an external memory). That is, the communication apparatus may include the processor 1310. The processor 1310 invokes the program in the memory, to perform the methods performed by the communication apparatus in the foregoing method embodiments. The processor herein may be an integrated circuit having a signal processing capability, for example, a CPU. The communication apparatus may be implemented by one or more integrated circuits configured to implement the foregoing methods, for example, one or more ASICs, one or more microprocessors DSPs, one or more FPGAs, or a combination of at least two of the integrated circuit forms. Alternatively, the foregoing implementations may be combined.

Specifically, a function/an implementation process of the transceiver unit 1210 and the processing unit 1220 in FIG. 12 may be implemented by the processor 1310 in the communication apparatus 1300 shown in FIG. 13 by invoking computer-executable instructions stored in the memory 1320. Alternatively, a function/an implementation process of the processing unit 1220 in FIG. 12 may be implemented by the processor 1310 in the communication apparatus 1300 shown in FIG. 13 by invoking computer-executable instructions stored in the memory 1320, and a function/an implementation process of the transceiver unit 1210 in FIG. 12 may be implemented by using the interface 1330 in the communication apparatus 1300 shown in FIG. 13.

It should be understood that in the various embodiments of this application, sequence numbers (or numbers) of the foregoing processes do not mean execution sequences in the embodiments of this application. The execution sequences of the processes should be determined based on functions and internal logic of the processes, and should not constitute any limitation on implementation processes of the embodiments of the present disclosure.

This application further provides a computer-readable medium storing a computer program. When the computer program is executed by a computer, functions of any foregoing method embodiment are implemented.

This application further provides a computer program product. When the computer program product is executed by a computer, functions of any foregoing method embodiment are implemented.

It may be clearly understood by a person skilled in the art that, for the purpose of convenient and brief description, for a detailed working process of the foregoing system, apparatus, and unit, are a corresponding process in the foregoing method embodiments, and details are not described herein again.

All or some of the foregoing embodiments may be implemented by software, hardware, firmware, or any combination thereof. When the embodiments are implemented by using software, all or some of the embodiments may be implemented in a form of a computer program product. The computer program product includes one or more computer instructions. When the computer instructions are loaded and executed on a computer, the procedure or functions according to embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The various illustrative logic units and circuits described in embodiments of this application may implement or operate the described functions by using a general-purpose processor, a digital signal processor, an application-specific integrated circuit (ASIC), a field programmable gate array (FPGA) or another programmable logic apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may be implemented by a combination of computing apparatuses, for example, a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may be integrated into a processor. The processor and the storage medium may be disposed in the ASIC.

These computer instructions may be loaded onto a computer or another programmable data processing device, so that a series of operations and steps are performed on the computer or another programmable device, thereby generating computer-implemented processing. Therefore, the instructions executed on the computer or the other programmable device provide steps for implementing a specific function in one or more processes in the flowcharts and/or in one or more blocks in the block diagrams.

In one or more examples of designs, the functions described in this application may be implemented by using hardware, software, firmware, or any combination thereof. If the functions are implemented by using software, these functions may be stored in a computer-readable medium or are transmitted to the computer-readable medium in a form of one or more instructions or code. The computer-readable medium is either a computer storage medium or a communication medium that enables a computer program to move from one place to another. The storage medium may be an available medium that may be accessed by any general-purpose or dedicated computer. For example, such a computer-readable medium may include but is not limited to a RAM, a ROM, an EEPROM, a CD-ROM, or another optical disc storage, a disk storage or another magnetic storage apparatus, or any other medium that may be used to carry or store program code, where the program code is in a form of instructions or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc include a compact disc, a laser disc, an optical disc, a digital versatile disc (DVD for short), a floppy disk, and a Blu-ray disc. The disc usually copies data in a magnetic manner, and the disk usually optically copies data in a laser manner. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, and the communication medium includes any medium that enables a computer program to be transmitted from one place to another. The storage medium may be any available medium accessible to a general-purpose or a dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application. According to the foregoing descriptions of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs, but may also be extended to a maximum scope that is consistent with the principles and new features disclosed in this application.

Although this application is described with reference to specific features and all the embodiments thereof, it is clear that various modifications and combinations may be made to them without departing from the scope of this application. Correspondingly, this specification and the accompanying drawings are merely example description of this application defined by the appended claims, and are considered as any or all of modifications, variations, combinations or equivalents that cover the scope of this application. It is clear that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A data transmission method, wherein the method comprises:

generating N ciphertext data streams, wherein a first ciphertext data stream is any ciphertext data stream in the N ciphertext data streams, the first ciphertext data stream comprises at least two first alignment markers (AMs) and at least two ciphertext data segments, one ciphertext data segment is comprised between every two first AMs, one first AM is comprised between every two ciphertext data segments, the at least two first AMs are used for aligning data of the N ciphertext data streams, some or all of the first AMs in the at least two first AMs indicate encryption parameters of the at least two ciphertext data segments, an encryption parameter carried in a first AM set comprises an initialization vector (IV) or a key identification, and N is a positive integer; and sending the N ciphertext data streams, wherein the first ciphertext data stream comprises the first AM set, the first AM set comprises L first AMs, the first AM set is used for carrying an encryption parameter of at least one specified ciphertext data segment, and L is a positive integer; and wherein p first AMs in the first AM set are used for carrying the initialization vector (IV) that is redundant m times, wherein p is a positive integer less than L, and m is a natural number, and q first AMs in the first AM set are used for carrying the key identification that is redundant n times, wherein q is a positive integer less than L, and n is a natural number.

2. The method according to claim 1, wherein r first AMs in the first AM set are used for carrying an identifier of the first AM set, and r is a positive integer less than L.

3. The method according to claim 2, wherein a value of L is 50, a value of p is 48, a value of m is 11, a value of q is 1, a value of n is 11, and a value of r is 1.

4. The method according to claim 1, wherein the at least one specified ciphertext data segment comprises a first ciphertext data segment following each first AM in the first AM set.

5. The method according to claim 1, wherein the at least one specified ciphertext data segment comprises at least one ciphertext data segment following a specified AM, and the specified AM is a first AM that is in the first ciphertext data stream and that follows the first AM set.

6. A data transmission method, wherein the method comprises:

obtaining N ciphertext data streams, wherein a first ciphertext data stream is any ciphertext data stream in the N ciphertext data streams, the first ciphertext data stream comprises at least two first alignment markers (AMs) and at least two ciphertext data segments, one ciphertext data segment is comprised between every two first AMs, one first AM is comprised between every two ciphertext data segments, the at least two first AMs are used for aligning data of the N ciphertext data streams, some or all of the first AMs in the at least two first AMs indicate encryption parameters of the at least two ciphertext data segments, an encryption parameter carried in a first AM set comprises an initialization vector (IV) or a key identification, and N is a positive integer;

obtaining the encryption parameters of the at least two ciphertext data segments based on the at least two first AMs; and decrypting the first ciphertext data stream based on the encryption parameters of the at least two ciphertext data segments, to obtain a first plaintext data stream, wherein the first plaintext data stream is any plaintext data stream in N plaintext data streams;

wherein the first ciphertext data stream comprises the first AM set, the first AM set comprises L first AMs, the first AM set is used for carrying an encryption parameter of at least one specified ciphertext data segment, and L is a positive integer; and wherein p first AMs in the first AM set are used for carrying the initialization vector (IV) that is redundant m times, wherein p is a positive integer less than L, and m is a natural number, and q first AMs in the first AM set are used for carrying the key identification that is redundant n times, wherein q is a positive integer less than L, and n is a natural number.

7. The method according to claim 6, wherein the first plaintext data stream comprises at least two second AMs and at least two plaintext data segments, one plaintext data segment is comprised between every two second AMs, one second AM is comprised between every two plaintext data segments, and the at least two second AMs are used for aligning data of the N plaintext data streams.

8. The method according to claim 6, wherein the decrypting of the first ciphertext data stream based on the encryption parameters of the at least two ciphertext data segments to obtain a first plaintext data stream comprises:

decrypting the at least two ciphertext data segments in the first ciphertext data stream based on the encryption parameters of the at least two ciphertext data segments, to obtain at least two plaintext data segments in the first plaintext data stream; and processing the at least two first AMs in the first ciphertext data stream based on the encryption parameters of the at least two ciphertext data segments, to obtain at least two second AMs in the first plaintext data stream.

9. The method according to claim 6, wherein r first AMs in the first AM set are used for carrying an identifier of the first AM set, and r is a positive integer less than L.

10. The method according to claim 9, wherein a value of L is 50, a value of p is 48, a value of m is 11, a value of q is 1, a value of n is 11, and a value of r is 1.

11. A data transmission apparatus, comprising:

one or more processors; and a computer-readable memory storing a program to be executed by the one or more processors, the program including instructions that, when executed by the one or more processors, cause the apparatus to:

generate N ciphertext data streams, wherein a first ciphertext data stream is any ciphertext data stream in the N ciphertext data streams, the first ciphertext data stream comprises at least two first alignment markers (AMs) and at least two ciphertext data segments, one ciphertext data segment is comprised between every two first AMs, one first AM is comprised between every two ciphertext data segments, the at least two first AMs are used for aligning data of the N ciphertext data streams, some or all of the first AMs in the at least two first AMs indicate encryption parameters of the at least two ciphertext data segments, an encryption parameter carried in a first AM set comprises an initialization vector (IV) or a key identification, and N is a positive integer; and send the N ciphertext data streams, wherein the first ciphertext data stream comprises the first AM set, the first AM set comprises L first AMs, the first AM set is used for carrying an encryption parameter of at least one specified ciphertext data segment, and L is a positive integer; and wherein p first AMs in the first AM set are used for carrying the initialization vector (IV) that is redundant m times, wherein p is a positive integer less than L, and m is a natural number, and q first AMs in the first AM set are used for carrying the key identification that is redundant n times, wherein q is a positive integer less than L, and n is a natural number.

12. The apparatus according to claim 11, wherein r first AMs in the first AM set are used for carrying an identifier of the first AM set, and r is a positive integer less than L.

13. The apparatus according to claim 12, wherein a value of L is 50, a value of p is 48, a value of m is 11, a value of q is 1, a value of n is 11, and a value of r is 1.

14. The apparatus according to claim 11, wherein the at least one specified ciphertext data segment comprises a first ciphertext data segment following each first AM in the first AM set.

15. The method according to claim 1, wherein the generating N ciphertext data streams comprises:

obtaining N plaintext data streams, wherein a first plaintext data stream is any plaintext data stream in the N plaintext data streams, the first plaintext data stream comprises at least two second AMs and at least two plaintext data segments, one plaintext data segment is comprised between every two second AMs, one second AM is comprised between every two plaintext data segments, and the at least two second AMs are used for aligning data of the N plaintext data streams; and generating the first ciphertext data stream based on the first plaintext data stream and the encryption parameters of the at least two ciphertext data segments.

16. The method according to claim 15 wherein the generating the first ciphertext data stream based on the first plaintext data stream and the encryption parameters of the at least two ciphertext data segments comprises:

encrypting the at least two plaintext data segments in the first plaintext data stream based on the encryption parameters of the at least two ciphertext data segments, to obtain the at least two ciphertext data segments in the first ciphertext data stream; and processing the at least two second AMs in the first plaintext data stream based on the encryption parameters of the at least two ciphertext data segments, to obtain the at least two first AMs in the first ciphertext data stream.

17. The method according to claim 6, wherein the at least one specified ciphertext data segment comprises a first ciphertext data segment following each first AM in the first AM set.

18. The method according to claim 6, wherein the at least one specified ciphertext data segment comprises at least one ciphertext data segment following a specified AM, and the specified AM is a first AM that is in the first ciphertext data stream and that follows the first AM set.

19. The apparatus according to claim 11, wherein the at least one specified ciphertext data segment comprises at least one ciphertext data segment following a specified AM, and the specified AM is a first AM that is in the first ciphertext data stream and that follows the first AM set.

20. The apparatus according to claim 11, wherein the generating N ciphertext data streams comprises:

obtaining N plaintext data streams, wherein a first plaintext data stream is any plaintext data stream in the N plaintext data streams, the first plaintext data stream comprises at least two second AMs and at least two plaintext data segments, one plaintext data segment is comprised between every two second AMs, one second AM is comprised between every two plaintext data segments, and the at least two second AMs are used for aligning data of the N plaintext data streams; and generating the first ciphertext data stream based on the first plaintext data stream and the encryption parameters of the at least two ciphertext data segments.

* * * * *